(12) United States Patent
Morriss et al.

(10) Patent No.: US 8,439,687 B1
(45) Date of Patent: *May 14, 2013

(54) APPARATUS AND METHOD FOR SIMULATED INSERTION AND POSITIONING OF GUIDEWARES AND OTHER INTERVENTIONAL DEVICES

(75) Inventors: John H. Morriss, Portola Valley, CA (US); John Y. Chang, Mountain View, CA (US)

(73) Assignee: Acclarent, Inc., Menlo Park, CA (US)

( * ) Notice: Subject to any disclaimer, the term of this patent is extended or adjusted under 35 U.S.C. 154(b) by 1322 days.

This patent is subject to a terminal disclaimer.

(21) Appl. No.: 11/648,159

(22) Filed: Dec. 29, 2006

(51) Int. Cl.
*G09B 23/28* (2006.01)
(52) U.S. Cl.
USPC .......................................................... 434/267
(58) Field of Classification Search .................. 434/262, 434/267, 268, 272
See application file for complete search history.

(56) References Cited

U.S. PATENT DOCUMENTS

| | | |
|---|---|---|
| 446,173 A | 2/1891 | C. Hancock |
| 504,424 A | 9/1893 | De Pezzer |
| 513,667 A | 1/1894 | Buckingham |
| 705,346 A | 7/1902 | Hamilton |
| 798,775 A | 9/1905 | Forsyth |
| 816,792 A | 4/1906 | Green et al. |
| 1,080,934 A | 12/1913 | Shackleford |
| 1,200,267 A | 10/1916 | Sunnergren |
| 1,650,959 A | 11/1927 | Pitman |
| 1,735,519 A | 11/1929 | Vance |
| 1,828,986 A | 10/1931 | Stevens |
| 1,878,671 A | 9/1932 | Cantor |
| 2,201,749 A | 5/1940 | Vandegrift |
| 2,525,183 A | 3/1947 | Robison |
| 2,493,326 A | 1/1950 | Trinder |
| 2,847,997 A | 8/1958 | Tibone |
| 2,899,227 A | 8/1959 | Gschwend |
| 2,906,179 A | 9/1959 | Bower |
| 2,995,832 A * | 8/1961 | Alderson ...................... 434/268 |
| 3,009,265 A | 11/1961 | Bezark |
| 3,037,286 A | 6/1962 | Bower |
| 3,173,418 A | 3/1965 | Baran |
| 3,347,061 A | 10/1967 | Stuemky |
| 3,376,659 A * | 4/1968 | Asin et al. ...................... 434/272 |
| 3,384,970 A | 5/1968 | Avalear |

(Continued)

FOREIGN PATENT DOCUMENTS

| | | |
|---|---|---|
| CH | 668188 | 12/1988 |
| CN | 2151720 | 1/1994 |

(Continued)

OTHER PUBLICATIONS

U.S. Appl. No. 11/527,773, filed Sep. 10, 1913, White.

(Continued)

*Primary Examiner* — Kurt Fernstrom
(74) *Attorney, Agent, or Firm* — Robert D. Buyan; Stout, Uxa, Buyan & Mullins, LLP

(57) ABSTRACT

Apparatus and methods useable for simulated insertion and positioning of medical or surgical devices. The apparatus generally comprises a substantially flat structure having simulated body openings, anatomical passageways, anatomical structures and anatomical cavities formed therein. One or more windows (e.g., a transparent top panel or cover) allows the operator to observe the movement or positioning of the medical or surgical device.

13 Claims, 5 Drawing Sheets

U.S. PATENT DOCUMENTS

| | | | |
|---|---|---|---|
| 3,393,073 A | 7/1968 | Reutenauer et al. | |
| 3,435,826 A | 4/1969 | Fogarty | |
| 3,469,578 A | 9/1969 | Bierman | |
| 3,481,043 A | 12/1969 | Esch | |
| 3,486,539 A | 12/1969 | Jacuzzi | |
| 3,506,005 A | 4/1970 | Gilio et al. | |
| 3,509,638 A | 5/1970 | Macleod | |
| 3,515,888 A | 6/1970 | Lewis | |
| 3,527,220 A | 9/1970 | Summers | |
| 3,531,868 A | 10/1970 | Stevenson | |
| 3,552,384 A | 1/1971 | Pierie et al. | |
| 3,624,661 A | 11/1971 | Shebanow et al. | |
| 3,731,963 A | 5/1973 | Pond | |
| 3,792,391 A | 2/1974 | Ewing | |
| 3,800,788 A | 4/1974 | White | |
| 3,802,096 A | 4/1974 | Matern | |
| 3,804,081 A | 4/1974 | Kinoshita | |
| 3,834,394 A | 9/1974 | Hunter et al. | |
| 3,850,176 A | 11/1974 | Gottschalk | |
| 3,856,000 A | 12/1974 | Chikama | |
| 3,859,993 A | 1/1975 | Bitner | |
| 3,871,365 A | 3/1975 | Chikama | |
| 3,894,538 A | 7/1975 | Richter | |
| 3,903,893 A | 9/1975 | Scheer | |
| 3,910,617 A | 10/1975 | Scalza et al. | |
| 3,921,636 A | 11/1975 | Zaffaroni | |
| 3,948,254 A | 4/1976 | Zaffaroni | |
| 3,948,262 A | 4/1976 | Zaffaroni | |
| 3,967,618 A | 7/1976 | Zaffaroni | |
| 3,993,069 A | 11/1976 | Buckles et al. | |
| 3,993,072 A | 11/1976 | Zaffaroni | |
| 3,993,073 A | 11/1976 | Zaffaroni | |
| 4,016,251 A | 4/1977 | Higuchi et al. | |
| 4,052,505 A | 10/1977 | Higuchi et al. | |
| 4,053,975 A | 10/1977 | Olbrich et al. | |
| 4,069,307 A | 1/1978 | Higuchi et al. | |
| 4,102,342 A | 7/1978 | Akiyama et al. | |
| 4,138,151 A | 2/1979 | Nakao | |
| 4,184,497 A | 1/1980 | Kolff et al. | |
| 4,198,766 A * | 4/1980 | Camin | 434/272 |
| 4,207,890 A | 6/1980 | Mamajek et al. | |
| 4,209,919 A | 7/1980 | Kirikae et al. | |
| 4,213,095 A | 7/1980 | Falconer | |
| 4,217,898 A | 8/1980 | Theeuwes | |
| 4,268,115 A | 5/1981 | Slemon et al. | |
| 4,299,226 A | 11/1981 | Banka | |
| 4,299,227 A | 11/1981 | Lincoff | |
| 4,312,353 A | 1/1982 | Shahbabian | |
| 4,338,941 A | 7/1982 | Payton | |
| D269,204 S | 5/1983 | Trepp | |
| 4,388,941 A | 6/1983 | Riedhammer | |
| RE31,351 E | 8/1983 | Falconer | |
| 4,435,716 A | 3/1984 | Zandbergen | |
| 4,437,856 A | 3/1984 | Valli | |
| 4,450,150 A | 5/1984 | Sidman | |
| 4,459,977 A | 7/1984 | Pizon et al. | |
| 4,464,175 A | 8/1984 | Altman et al. | |
| 4,471,779 A | 9/1984 | Antoshkiw et al. | |
| 4,499,899 A | 2/1985 | Lyons, III | |
| 4,554,929 A | 11/1985 | Samson et al. | |
| 4,564,364 A | 1/1986 | Zaffaroni et al. | |
| 4,571,239 A | 2/1986 | Heyman | |
| 4,571,240 A | 2/1986 | Samson et al. | |
| 4,581,017 A | 4/1986 | Sahota | |
| 4,585,000 A | 4/1986 | Hershenson | |
| D283,921 S | 5/1986 | Dyak | |
| 4,589,868 A | 5/1986 | Dretler | |
| 4,596,528 A | 6/1986 | Lewis et al. | |
| D284,892 S | 7/1986 | Glassman | |
| 4,603,564 A | 8/1986 | Kleinhany et al. | |
| 4,606,346 A | 8/1986 | Berg et al. | |
| 4,607,622 A | 8/1986 | Fritch et al. | |
| 4,637,389 A | 1/1987 | Heyden | |
| 4,639,244 A | 1/1987 | Rizk et al. | |
| 4,645,495 A | 2/1987 | Vaillancourt | |
| 4,669,469 A | 6/1987 | Gifford, III | |
| 4,672,961 A | 6/1987 | Davies | |
| 4,675,613 A | 6/1987 | Naegeli et al. | |
| 4,691,948 A | 9/1987 | Austin, Jr. et al. | |
| 4,708,434 A | 11/1987 | Tsuno | |
| 4,708,834 A | 11/1987 | Cohen et al. | |
| 4,726,772 A * | 2/1988 | Amplatz | 434/272 |
| 4,736,970 A | 4/1988 | McGourty et al. | |
| 4,737,141 A | 4/1988 | Spits | |
| 4,748,869 A | 6/1988 | Ohtsuka | |
| 4,748,969 A | 6/1988 | Wardle | |
| 4,748,986 A | 6/1988 | Morrison et al. | |
| 4,755,171 A | 7/1988 | Tennant | |
| 4,771,776 A | 9/1988 | Powell et al. | |
| 4,793,359 A | 12/1988 | Sharrow | |
| 4,795,439 A | 1/1989 | Guest | |
| 4,796,629 A | 1/1989 | Grayzel | |
| 4,803,076 A | 2/1989 | Ranade | |
| 4,811,743 A | 3/1989 | Stevens | |
| 4,815,478 A | 3/1989 | Buchbinder et al. | |
| 4,819,619 A | 4/1989 | Augustine et al. | |
| 4,846,186 A | 7/1989 | Box et al. | |
| 4,847,258 A | 7/1989 | Sturm et al. | |
| 4,851,228 A | 7/1989 | Zentner et al. | |
| 4,854,330 A | 8/1989 | Evans, III et al. | |
| 4,862,874 A | 9/1989 | Kellner | |
| 4,867,138 A | 9/1989 | Kubota et al. | |
| 4,883,465 A | 11/1989 | Brennan | |
| 4,897,651 A | 1/1990 | DeMonte | |
| 4,898,577 A | 2/1990 | Badger et al. | |
| 4,917,419 A | 4/1990 | Mora, Jr. et al. | |
| 4,917,667 A | 4/1990 | Jackson | |
| 4,919,112 A | 4/1990 | Siegmund | |
| 4,920,967 A | 5/1990 | Cottonaro et al. | |
| 4,925,445 A | 5/1990 | Sakamoto et al. | |
| 4,940,062 A | 7/1990 | Hampton et al. | |
| 4,943,275 A | 7/1990 | Stricker | |
| 4,946,466 A | 8/1990 | Pinchuk et al. | |
| 4,961,433 A | 10/1990 | Christian | |
| 4,966,163 A | 10/1990 | Kraus et al. | |
| 4,984,581 A | 1/1991 | Stice | |
| 4,994,033 A | 2/1991 | Shockey et al. | |
| 4,998,916 A | 3/1991 | Hammerslag et al. | |
| 4,998,917 A | 3/1991 | Gaiser et al. | |
| 5,001,825 A | 3/1991 | Halpern | |
| 5,002,322 A | 3/1991 | Fukumoto | |
| 5,019,075 A | 5/1991 | Spears et al. | |
| 5,019,372 A | 5/1991 | Folkman et al. | |
| 5,020,514 A | 6/1991 | Heckele | |
| 5,021,043 A | 6/1991 | Becker et al. | |
| 5,024,650 A | 6/1991 | Hagiwara et al. | |
| 5,024,658 A | 6/1991 | Kozlov et al. | |
| 5,026,384 A | 6/1991 | Farr et al. | |
| 5,030,227 A | 7/1991 | Rosenbluth et al. | |
| 5,041,089 A | 8/1991 | Mueller et al. | |
| 5,044,678 A | 9/1991 | Detweiler | |
| 5,053,007 A | 10/1991 | Euteneuer | |
| 5,055,051 A * | 10/1991 | Duncan | 434/262 |
| 5,060,660 A | 10/1991 | Gambale et al. | |
| 5,067,489 A | 11/1991 | Lind | |
| 5,069,226 A | 12/1991 | Yamauchi et al. | |
| 5,087,244 A | 2/1992 | Wolinsky et al. | |
| 5,087,246 A | 2/1992 | Smith | |
| 5,090,595 A | 2/1992 | Vandoninck | |
| 5,090,910 A | 2/1992 | Narlo | |
| 5,112,228 A * | 5/1992 | Zouras | 434/272 |
| 5,116,311 A | 5/1992 | Lofstedt | |
| 5,127,393 A | 7/1992 | McFarlin et al. | |
| 5,137,517 A | 8/1992 | Loney et al. | |
| 5,139,510 A | 8/1992 | Goldsmith, III et al. | |
| 5,139,832 A | 8/1992 | Hayashi et al. | |
| D329,496 S | 9/1992 | Wotton | |
| 5,152,747 A | 10/1992 | Olivier | |
| 5,156,595 A | 10/1992 | Adams | |
| 5,163,989 A | 11/1992 | Campbell et al. | |
| 5,167,220 A | 12/1992 | Brown | |
| 5,168,864 A | 12/1992 | Shockey | |
| 5,169,043 A | 12/1992 | Catania | |
| 5,169,386 A | 12/1992 | Becker et al. | |
| 5,171,233 A | 12/1992 | Amplatz et al. | |
| 5,180,368 A | 1/1993 | Garrison | |
| 5,183,470 A | 2/1993 | Wettermann | |

| Patent | Type | Date | Inventor |
|---|---|---|---|
| 5,189,110 | A | 2/1993 | Ikematu et al. |
| 5,195,168 | A | 3/1993 | Yong |
| 5,197,457 | A | 3/1993 | Adair |
| 5,207,695 | A | 5/1993 | Trout, III |
| 5,211,952 | A | 5/1993 | Spicer et al. |
| 5,215,105 | A | 6/1993 | Kizelshteyn et al. |
| 5,221,260 | A | 6/1993 | Burns et al. |
| 5,226,302 | A | 7/1993 | Anderson |
| 5,230,348 | A | 7/1993 | Ishibe et al. |
| 5,236,422 | A | 8/1993 | Eplett, Jr. |
| 5,243,996 | A | 9/1993 | Hall |
| D340,111 | S | 10/1993 | Yoshikawa |
| 5,250,059 | A | 10/1993 | Andreas et al. |
| 5,251,092 | A | 10/1993 | Brady et al. |
| 5,252,183 | A | 10/1993 | Shaban et al. |
| 5,255,679 | A | 10/1993 | Imran |
| 5,256,144 | A | 10/1993 | Kraus et al. |
| 5,263,926 | A | 11/1993 | Wilk |
| 5,264,260 | A | 11/1993 | Saab |
| 5,267,965 | A | 12/1993 | Deniega |
| 5,270,086 | A | 12/1993 | Hamlin |
| 5,273,052 | A | 12/1993 | Kraus et al. |
| 5,275,593 | A | 1/1994 | Easley et al. |
| 5,286,254 | A | 2/1994 | Shapland et al. |
| 5,290,310 | A | 3/1994 | Makower et al. |
| 5,295,694 | A * | 3/1994 | Levin .......................... 273/447 |
| 5,300,085 | A | 4/1994 | Yock |
| 5,304,123 | A | 4/1994 | Atala et al. |
| 5,308,326 | A | 5/1994 | Zimmon |
| 5,313,967 | A | 5/1994 | Lieber et al. |
| 5,314,417 | A | 5/1994 | Stephens et al. |
| 5,315,618 | A | 5/1994 | Yoshida |
| 5,324,306 | A | 6/1994 | Makower et al. |
| 5,333,620 | A | 8/1994 | Moutafis et al. |
| 5,334,167 | A | 8/1994 | Cocanower |
| 5,336,163 | A | 8/1994 | DeMane et al. |
| 5,341,818 | A | 8/1994 | Abrams et al. |
| 5,342,296 | A | 8/1994 | Persson et al. |
| 5,343,865 | A | 9/1994 | Gardineer et al. |
| 5,345,945 | A | 9/1994 | Hodgson et al. |
| 5,346,075 | A | 9/1994 | Nichols et al. |
| 5,346,508 | A | 9/1994 | Hastings |
| 5,348,537 | A | 9/1994 | Wiesner et al. |
| 5,350,396 | A | 9/1994 | Eliachar |
| 5,356,418 | A | 10/1994 | Shturman |
| 5,368,049 | A | 11/1994 | Raman et al. |
| 5,368,558 | A | 11/1994 | Nita |
| 5,368,566 | A | 11/1994 | Crocker |
| 5,372,138 | A | 12/1994 | Crowley et al. |
| 5,372,584 | A | 12/1994 | Zink et al. |
| D355,031 | S | 1/1995 | Yoshikawa |
| 5,386,817 | A | 2/1995 | Jones |
| 5,391,147 | A | 2/1995 | Imran et al. |
| 5,391,179 | A | 2/1995 | Mezzoli |
| 5,402,799 | A | 4/1995 | Colon et al. |
| 5,409,444 | A | 4/1995 | Kensey |
| 5,411,475 | A | 5/1995 | Atala et al. |
| 5,411,476 | A | 5/1995 | Abrams et al. |
| 5,411,477 | A | 5/1995 | Saab |
| 5,415,633 | A | 5/1995 | Lazarus |
| 5,425,370 | A | 6/1995 | Vilkomerson |
| 5,439,446 | A | 8/1995 | Barry |
| 5,441,494 | A | 8/1995 | Ortiz |
| 5,441,497 | A | 8/1995 | Narciso, Jr. |
| 5,450,853 | A | 9/1995 | Hastings et al. |
| 5,451,221 | A | 9/1995 | Cho et al. |
| 5,454,817 | A | 10/1995 | Katz |
| 5,458,572 | A | 10/1995 | Campbell et al. |
| 5,465,717 | A | 11/1995 | Imran et al. |
| 5,465,733 | A | 11/1995 | Hinohara et al. |
| 5,478,565 | A | 12/1995 | Geria |
| 5,486,181 | A | 1/1996 | Cohen et al. |
| 5,496,338 | A | 3/1996 | Miyagi et al. |
| 5,497,783 | A | 3/1996 | Urick et al. |
| 5,507,301 | A | 4/1996 | Wasicek et al. |
| 5,507,725 | A | 4/1996 | Savage et al. |
| 5,507,766 | A | 4/1996 | Kugo et al. |
| 5,512,055 | A | 4/1996 | Domb et al. |
| 5,514,128 | A | 5/1996 | Hillsman et al. |
| 5,519,532 | A | 5/1996 | Broome |
| 5,531,676 | A | 7/1996 | Edwards et al. |
| 5,533,985 | A | 7/1996 | Wong |
| 5,538,008 | A | 7/1996 | Crowe |
| 5,546,964 | A | 8/1996 | Stangerup |
| 5,549,542 | A | 8/1996 | Kovalcheck |
| 5,558,073 | A | 9/1996 | Pomeranz et al. |
| 5,558,652 | A | 9/1996 | Henke |
| 5,562,619 | A | 10/1996 | Mirarchi et al. |
| 5,568,809 | A | 10/1996 | Ben-Haim |
| 5,571,086 | A | 11/1996 | Kaplan et al. |
| 5,578,007 | A | 11/1996 | Imran |
| 5,578,048 | A | 11/1996 | Pasqualucci et al. |
| 5,584,827 | A | 12/1996 | Korteweg et al. |
| 5,591,194 | A | 1/1997 | Berthiaume |
| 5,599,284 | A | 2/1997 | Shea |
| 5,599,304 | A | 2/1997 | Shaari |
| 5,599,576 | A | 2/1997 | Opolski |
| 5,601,087 | A | 2/1997 | Gunderson et al. |
| 5,601,594 | A | 2/1997 | Best |
| 5,607,386 | A | 3/1997 | Flam |
| 5,617,870 | A | 4/1997 | Hastings et al. |
| 5,626,374 | A | 5/1997 | Heong-III |
| 5,633,000 | A | 5/1997 | Grossman et al. |
| 5,634,908 | A | 6/1997 | Loomas |
| 5,638,819 | A | 6/1997 | Manwaring et al. |
| 5,643,251 | A | 7/1997 | Hillsman et al. |
| 5,645,789 | A | 7/1997 | Roucher, Jr. |
| 5,647,361 | A | 7/1997 | Damadian |
| 5,656,030 | A | 8/1997 | Hunjan et al. |
| 5,662,674 | A | 9/1997 | Debbas |
| 5,664,567 | A | 9/1997 | Linder |
| 5,664,580 | A | 9/1997 | Erickson et al. |
| 5,665,052 | A | 9/1997 | Bullard |
| 5,669,388 | A | 9/1997 | Vilkomerson |
| 5,673,707 | A | 10/1997 | Chandrasekaran |
| 5,676,673 | A | 10/1997 | Ferre et al. |
| 5,679,400 | A | 10/1997 | Tuch |
| 5,682,199 | A | 10/1997 | Lankford |
| 5,685,838 | A | 11/1997 | Peters et al. |
| 5,685,847 | A | 11/1997 | Barry |
| 5,690,373 | A | 11/1997 | Luker |
| 5,693,065 | A | 12/1997 | Rains, III |
| 5,694,945 | A | 12/1997 | Ben-Haim |
| 5,697,159 | A | 12/1997 | Linden |
| 5,700,286 | A | 12/1997 | Tartaglia et al. |
| 5,707,389 | A | 1/1998 | Louw et al. |
| 5,708,175 | A | 1/1998 | Koyanagi et al. |
| 5,711,315 | A | 1/1998 | Jerusalmy |
| 5,713,839 | A | 2/1998 | Shea |
| 5,713,946 | A | 2/1998 | Ben-Haim |
| 5,718,702 | A | 2/1998 | Edwards |
| 5,720,300 | A | 2/1998 | Fagan et al. |
| 5,722,401 | A | 3/1998 | Pietroski et al. |
| 5,722,984 | A | 3/1998 | Fischell et al. |
| 5,729,129 | A | 3/1998 | Acker |
| 5,730,128 | A | 3/1998 | Pomeranz et al. |
| 5,733,248 | A | 3/1998 | Adams et al. |
| 5,752,513 | A | 5/1998 | Acker et al. |
| 5,762,604 | A | 6/1998 | Kieturakis |
| 5,766,158 | A | 6/1998 | Opolski |
| 5,775,327 | A | 7/1998 | Randolph et al. |
| 5,776,158 | A | 7/1998 | Chou |
| 5,779,699 | A | 7/1998 | Lipson |
| 5,789,391 | A | 8/1998 | Jacobus et al. |
| 5,792,100 | A | 8/1998 | Shantha |
| 5,797,878 | A | 8/1998 | Bleam |
| 5,803,089 | A | 9/1998 | Ferre et al. |
| 5,814,016 | A | 9/1998 | Valley et al. |
| 5,819,723 | A | 10/1998 | Joseph |
| 5,820,568 | A | 10/1998 | Willis |
| 5,824,044 | A | 10/1998 | Quiachon et al. |
| 5,824,048 | A | 10/1998 | Tuch |
| 5,824,173 | A | 10/1998 | Fontirroche et al. |
| 5,827,224 | A | 10/1998 | Shippert |
| 5,830,188 | A | 11/1998 | Abouleish |
| 5,833,608 | A | 11/1998 | Acker |
| 5,833,645 | A | 11/1998 | Lieber et al. |
| 5,833,650 | A | 11/1998 | Imran |

| | | | | | |
|---|---|---|---|---|---|
| 5,833,682 A | 11/1998 | Amplatz et al. | 6,159,170 A | 12/2000 | Borodulin et al. |
| 5,836,638 A | 11/1998 | Slocum | 6,171,298 B1 | 1/2001 | Matsuura et al. |
| 5,836,935 A | 11/1998 | Ashton et al. | 6,171,303 B1 | 1/2001 | Ben-Haim |
| 5,837,313 A | 11/1998 | Ding et al. | 6,174,280 B1 | 1/2001 | Oneda et al. |
| 5,843,089 A | 12/1998 | Sahatjian et al. | 6,176,829 B1 | 1/2001 | Vilkomerson |
| 5,843,113 A | 12/1998 | High | 6,179,788 B1 | 1/2001 | Sullivan |
| 5,846,259 A | 12/1998 | Berthiaume | 6,179,811 B1 | 1/2001 | Fugoso et al. |
| 5,857,998 A | 1/1999 | Barry | 6,183,461 B1 | 2/2001 | Matsuura et al. |
| 5,862,693 A | 1/1999 | Myers et al. | 6,183,464 B1 | 2/2001 | Sharp et al. |
| 5,865,767 A | 2/1999 | Frechette et al. | 6,190,353 B1 | 2/2001 | Makower et al. |
| 5,872,879 A | 2/1999 | Hamm | 6,190,381 B1 | 2/2001 | Olsen et al. |
| 5,873,835 A | 2/1999 | Hastings | 6,193,650 B1 | 2/2001 | Ryan, Jr. |
| 5,887,467 A | 3/1999 | Butterweck et al. | 6,195,225 B1 | 2/2001 | Komatsu et al. |
| 5,902,247 A | 5/1999 | Coe et al. | 6,200,257 B1 | 3/2001 | Winkler |
| 5,902,333 A | 5/1999 | Roberts et al. | 6,206,870 B1 | 3/2001 | Kanner |
| 5,904,701 A | 5/1999 | Daneshvar | 6,213,975 B1 | 4/2001 | Laksin |
| 5,908,407 A | 6/1999 | Frazee et al. | 6,221,042 B1 | 4/2001 | Adams |
| 5,916,193 A | 6/1999 | Stevens et al. | 6,231,543 B1 | 5/2001 | Hegde et al. |
| 5,928,192 A | 7/1999 | Maahs | 6,234,958 B1 | 5/2001 | Snoke et al. |
| 5,931,811 A | 8/1999 | Haissaguerre et al. | 6,238,364 B1 | 5/2001 | Becker |
| 5,931,818 A | 8/1999 | Werp et al. | 6,238,391 B1 | 5/2001 | Olsen et al. |
| 5,932,035 A | 8/1999 | Koger et al. | 6,241,519 B1 | 6/2001 | Sedelemayer |
| 5,935,061 A | 8/1999 | Acker et al. | 6,249,180 B1 | 6/2001 | Maalej et al. |
| 5,941,816 A | 8/1999 | Barthel et al. | 6,254,550 B1 | 7/2001 | McNamara et al. |
| D413,629 S | 9/1999 | Wolff et al. | 6,268,574 B1 | 7/2001 | Edens |
| 5,947,988 A | 9/1999 | Smith | 6,293,957 B1 | 9/2001 | Peters et al. |
| 5,949,929 A | 9/1999 | Hamm | 6,302,875 B1 | 10/2001 | Makower et al. |
| 5,954,693 A | 9/1999 | Barry | 6,306,105 B1 | 10/2001 | Rooney et al. |
| 5,954,694 A | 9/1999 | Sunseri | 6,306,124 B1 | 10/2001 | Jones et al. |
| 5,957,842 A | 9/1999 | Littmann et al. | D450,382 S | 11/2001 | Nestenborg |
| 5,968,085 A | 10/1999 | Morris et al. | 6,322,495 B1 | 11/2001 | Snow et al. |
| 5,971,975 A | 10/1999 | Mills et al. | 6,328,564 B1 | 12/2001 | Thurow |
| 5,979,290 A | 11/1999 | Simeone | 6,332,089 B1 | 12/2001 | Acker et al. |
| 5,980,503 A | 11/1999 | Chin | 6,332,891 B1 | 12/2001 | Himes |
| 5,980,551 A | 11/1999 | Summers et al. | 6,340,360 B1 | 1/2002 | Lyles et al. |
| 5,984,945 A | 11/1999 | Sirhan | 6,348,041 B1 | 2/2002 | Klint |
| 5,985,307 A | 11/1999 | Hanson et al. | 6,352,503 B1 | 3/2002 | Matsui et al. |
| 5,997,562 A | 12/1999 | Zadno-Azizi | 6,375,615 B1 | 4/2002 | Flaherty et al. |
| 6,006,126 A | 12/1999 | Cosman | 6,375,629 B1 | 4/2002 | Muni et al. |
| 6,006,130 A | 12/1999 | Higo et al. | 6,383,146 B1 | 5/2002 | Klint |
| 6,007,516 A | 12/1999 | Burbank et al. | 6,386,197 B1 | 5/2002 | Miller |
| 6,007,991 A | 12/1999 | Sivaraman et al. | 6,389,313 B1 | 5/2002 | Marchitto et al. |
| 6,010,511 A | 1/2000 | Murphy | 6,390,993 B1 | 5/2002 | Cornish et al. |
| 6,013,019 A | 1/2000 | Fischell et al. | 6,394,093 B1 | 5/2002 | Lethi |
| 6,015,414 A | 1/2000 | Werp et al. | 6,398,758 B1 | 6/2002 | Jacobsen et al. |
| 6,016,429 A | 1/2000 | Khafizov et al. | 6,409,863 B1 | 6/2002 | Williams et al. |
| 6,016,439 A | 1/2000 | Acker | 6,423,012 B1 | 7/2002 | Kato et al. |
| 6,019,736 A | 2/2000 | Avellanet et al. | 6,425,877 B1 | 7/2002 | Edwards |
| 6,019,777 A | 2/2000 | Mackenzie | 6,432,986 B2 | 8/2002 | Levin |
| 6,021,340 A | 2/2000 | Randolph et al. | 6,440,061 B1 | 8/2002 | Wenner et al. |
| 6,022,313 A | 2/2000 | Ginn et al. | 6,443,947 B1 | 9/2002 | Marko et al. |
| 6,027,461 A | 2/2000 | Walker et al. | 6,445,939 B1 | 9/2002 | Swanson et al. |
| 6,027,478 A | 2/2000 | Katz | 6,450,975 B1 | 9/2002 | Brennan et al. |
| 6,039,699 A | 3/2000 | Viera | 6,450,989 B2 | 9/2002 | Dubrul et al. |
| 6,042,561 A | 3/2000 | Ash et al. | 6,464,650 B2 | 10/2002 | Jafari et al. |
| 6,048,299 A | 4/2000 | von Hoffmann | 6,468,202 B1 | 10/2002 | Irion et al. |
| 6,048,358 A | 4/2000 | Barak | 6,468,297 B1 | 10/2002 | Williams et al. |
| 6,053,172 A | 4/2000 | Hovda et al. | 6,485,475 B1 | 11/2002 | Chelly |
| 6,056,702 A | 5/2000 | Lorenzo | 6,491,940 B1 | 12/2002 | Levin |
| 6,059,752 A | 5/2000 | Segal | 6,494,894 B2 | 12/2002 | Mirarchi |
| 6,071,233 A | 6/2000 | Ishikawa et al. | 6,500,130 B2 | 12/2002 | Kinsella et al. |
| 6,079,755 A | 6/2000 | Chang | 6,500,189 B1 | 12/2002 | Lang et al. |
| 6,080,190 A | 6/2000 | Schwartz | 6,503,087 B1 | 1/2003 | Eggert et al. |
| 6,083,148 A | 7/2000 | Williams | 6,503,185 B1 | 1/2003 | Waksman et al. |
| 6,083,188 A | 7/2000 | Becker et al. | 6,511,418 B2 | 1/2003 | Shahidi et al. |
| 6,086,585 A | 7/2000 | Hovda et al. | 6,514,249 B1 | 2/2003 | Maguire et al. |
| 6,092,846 A | 7/2000 | Fuss et al. | 6,517,478 B2 | 2/2003 | Khadem |
| 6,093,150 A | 7/2000 | Chandler et al. | 6,524,299 B1 | 2/2003 | Tran et al. |
| 6,093,195 A | 7/2000 | Ouchi | 6,526,302 B2 | 2/2003 | Hassett |
| 6,109,268 A | 8/2000 | Thapliyal et al. | 6,527,753 B2 | 3/2003 | Sekine et al. |
| 6,113,567 A | 9/2000 | Becker | 6,529,756 B1 | 3/2003 | Phan et al. |
| 6,117,105 A | 9/2000 | Bresnaham et al. | 6,533,754 B1 | 3/2003 | Hisamatsu et al. |
| 6,122,541 A | 9/2000 | Cosman et al. | 6,536,437 B1 | 3/2003 | Dragisic |
| 6,123,697 A | 9/2000 | Shippert | 6,537,294 B1 | 3/2003 | Boyle et al. |
| 6,136,006 A | 10/2000 | Johnson et al. | 6,543,452 B1 | 4/2003 | Lavigne |
| 6,139,510 A | 10/2000 | Palermo | 6,544,230 B1 | 4/2003 | Flaherty et al. |
| 6,142,957 A | 11/2000 | Diamond et al. | 6,549,800 B1 | 4/2003 | Atalar et al. |
| 6,148,823 A | 11/2000 | Hastings | 6,551,239 B2 | 4/2003 | Renner et al. |
| 6,149,213 A | 11/2000 | Sokurenko et al. | 6,569,146 B1 | 5/2003 | Werner et al. |

| | | |
|---|---|---|
| 6,569,147 B1 | 5/2003 | Evans et al. |
| 6,571,131 B1 | 5/2003 | Nguyen |
| 6,572,538 B2 | 6/2003 | Takase |
| 6,572,590 B1 | 6/2003 | Stevens et al. |
| 6,579,285 B2 | 6/2003 | Sinofsky |
| 6,585,639 B1 | 7/2003 | Kotmel et al. |
| 6,585,717 B1 | 7/2003 | Wittenberger et al. |
| 6,585,794 B2 | 7/2003 | Shimoda et al. |
| 6,596,009 B1 | 7/2003 | Jelic |
| 6,607,546 B1 | 8/2003 | Murken |
| 6,613,066 B1 | 9/2003 | Fukaya et al. |
| 6,616,601 B2 | 9/2003 | Hayakawa |
| 6,616,659 B1 | 9/2003 | de la Torre et al. |
| 6,616,678 B2 | 9/2003 | Nishtala et al. |
| 6,616,913 B1 | 9/2003 | Mautone |
| 6,619,085 B1 | 9/2003 | Hsieh |
| 6,634,684 B2 | 10/2003 | Spiessl |
| 6,638,233 B2 | 10/2003 | Corvi et al. |
| 6,638,268 B2 | 10/2003 | Niazi |
| 6,638,291 B1 | 10/2003 | Ferrera et al. |
| 6,652,472 B2 | 11/2003 | Jafari et al. |
| 6,652,480 B1 | 11/2003 | Imran et al. |
| 6,663,589 B1 | 12/2003 | Halevy |
| 6,669,689 B2 | 12/2003 | Lehmann et al. |
| 6,669,711 B1 | 12/2003 | Noda |
| 6,672,773 B1 | 1/2004 | Glenn et al. |
| 6,673,025 B1 | 1/2004 | Richardson et al. |
| 6,685,648 B2 | 2/2004 | Flaherty et al. |
| 6,689,096 B1 | 2/2004 | Loubens et al. |
| 6,689,146 B1 | 2/2004 | Himes |
| 6,702,735 B2 | 3/2004 | Kelly |
| 6,712,757 B2 | 3/2004 | Becker et al. |
| 6,714,809 B2 | 3/2004 | Lee et al. |
| 6,716,216 B1 | 4/2004 | Boucher et al. |
| 6,716,813 B2 | 4/2004 | Lim et al. |
| 6,719,749 B1 | 4/2004 | Schweikert et al. |
| 6,755,812 B2 | 6/2004 | Peterson et al. |
| 6,776,772 B1 | 8/2004 | Vrijer et al. |
| 6,780,168 B2 | 8/2004 | Jellie |
| 6,783,522 B2 | 8/2004 | Fischell |
| 6,783,536 B2 | 8/2004 | Vilsmeier et al. |
| 6,786,864 B2 | 9/2004 | Matsuura et al. |
| 6,796,960 B2 | 9/2004 | Cioanta et al. |
| 6,817,976 B2 | 11/2004 | Rovegno |
| 6,832,715 B2 | 12/2004 | Eungard et al. |
| D501,677 S | 2/2005 | Becker |
| 6,851,290 B1 | 2/2005 | Meier et al. |
| 6,860,264 B2 | 3/2005 | Christopher |
| 6,860,849 B2 | 3/2005 | Matsushita et al. |
| 6,878,106 B1 | 4/2005 | Herrmann |
| 6,890,329 B2 | 5/2005 | Carroll et al. |
| 6,899,672 B2 | 5/2005 | Chin et al. |
| 6,902,556 B2 | 6/2005 | Grimes et al. |
| 6,927,478 B2 | 8/2005 | Paek |
| 6,939,361 B1 | 9/2005 | Kleshinski |
| 6,955,657 B1 | 10/2005 | Webler |
| 6,966,906 B2 | 11/2005 | Brown |
| 6,979,290 B2 | 12/2005 | Mourlas et al. |
| 6,991,597 B2 | 1/2006 | Gellman et al. |
| 6,997,931 B2 | 2/2006 | Sauer et al. |
| 6,997,941 B2 | 2/2006 | Sharkey et al. |
| 7,011,654 B2 | 3/2006 | Dubrul et al. |
| 7,022,105 B1 | 4/2006 | Edwards |
| 7,043,961 B2 | 5/2006 | Pandey |
| 7,052,474 B2 | 5/2006 | Castell et al. |
| 7,056,284 B2 | 6/2006 | Martone et al. |
| 7,056,303 B2 | 6/2006 | Dennis et al. |
| 7,074,197 B2 | 7/2006 | Reynolds et al. |
| 7,074,426 B2 | 7/2006 | Kochinke |
| 7,097,612 B2 | 8/2006 | Bertolero et al. |
| 7,108,706 B2 | 9/2006 | Hogle |
| 7,128,718 B2 | 10/2006 | Hojeibane et al. |
| 7,131,969 B1 | 11/2006 | Hovda et al. |
| 7,140,480 B2 | 11/2006 | Drussel et al. |
| D534,216 S | 12/2006 | Makower et al. |
| 7,160,255 B2 | 1/2007 | Saadat |
| 7,169,140 B1 | 1/2007 | Kume |
| 7,169,163 B2 | 1/2007 | Becker |
| 7,172,562 B2 | 2/2007 | McKinley |
| 7,174,774 B2 | 2/2007 | Pawar et al. |
| 7,182,735 B2 | 2/2007 | Shireman et al. |
| 7,184,827 B1 | 2/2007 | Edwards |
| 7,233,820 B2 | 6/2007 | Gilboa |
| 7,235,099 B1 | 6/2007 | Duncavage et al. |
| 7,237,313 B2 | 7/2007 | Skujins et al. |
| 7,252,677 B2 | 8/2007 | Burwell et al. |
| 7,282,057 B2 | 10/2007 | Surti et al. |
| 7,294,345 B2 | 11/2007 | Haapakumpu et al. |
| 7,294,365 B2 | 11/2007 | Hayakawa et al. |
| 7,316,168 B2 | 1/2008 | van der Knokke et al. |
| 7,318,831 B2 | 1/2008 | Alvarez et al. |
| 7,322,934 B2 | 1/2008 | Miyake et al. |
| 7,326,235 B2 | 2/2008 | Edwards |
| 7,338,467 B2 | 3/2008 | Lutter |
| 7,361,168 B2 | 4/2008 | Makower et al. |
| 7,366,562 B2 | 4/2008 | Dukesherer et al. |
| 7,371,210 B2 | 5/2008 | Brock et al. |
| 7,381,205 B2 | 6/2008 | Thommen |
| 7,410,480 B2 | 8/2008 | Muni et al. |
| 7,419,497 B2 | 9/2008 | Muni et al. |
| 7,442,191 B2 | 10/2008 | Hovda et al. |
| 7,452,351 B2 | 11/2008 | Miller et al. |
| 7,454,244 B2 | 11/2008 | Kassab et al. |
| 7,462,175 B2 | 12/2008 | Chang et al. |
| D586,465 S | 2/2009 | Faulkner et al. |
| D586,916 S | 2/2009 | Faulkner et al. |
| 7,488,313 B2 | 2/2009 | Segal et al. |
| 7,493,156 B2 | 2/2009 | Manning et al. |
| 7,500,971 B2 | 3/2009 | Chang et al. |
| D590,502 S | 4/2009 | Geisser et al. |
| 7,520,876 B2 | 4/2009 | Ressemann et al. |
| 7,532,920 B1 | 5/2009 | Ainsworth et al. |
| 7,559,925 B2 | 7/2009 | Goldfarb et al. |
| 7,625,335 B2 | 12/2009 | Deichmann et al. |
| 7,641,668 B2 | 1/2010 | Perry et al. |
| 7,645,272 B2 | 1/2010 | Chang et al. |
| 7,648,367 B1 * | 1/2010 | Makower et al. ............ 434/262 |
| 7,654,997 B2 | 2/2010 | Makower et al. |
| 7,717,933 B2 | 5/2010 | Becker |
| 7,720,521 B2 | 5/2010 | Chang et al. |
| 7,736,301 B1 | 6/2010 | Webler et al. |
| 7,740,642 B2 | 6/2010 | Becker |
| 7,753,929 B2 | 7/2010 | Becker |
| 7,799,048 B2 | 9/2010 | Hudson et al. |
| 7,803,150 B2 | 9/2010 | Chang et al. |
| 7,837,672 B2 | 11/2010 | Intoccia |
| D630,321 S | 1/2011 | Hamilton, Jr. |
| D632,791 S | 2/2011 | Murner |
| 7,988,705 B2 | 8/2011 | Galdonik et al. |
| 8,123,722 B2 | 2/2012 | Chang et al. |
| 8,197,552 B2 | 6/2012 | Mandpe |
| 2001/0004644 A1 | 6/2001 | Levin |
| 2001/0016684 A1 | 8/2001 | Shahidi |
| 2001/0023332 A1 | 9/2001 | Hahnen |
| 2001/0027307 A1 | 10/2001 | Dubrul et al. |
| 2001/0029317 A1 | 10/2001 | Hayakawa |
| 2001/0034530 A1 | 10/2001 | Malackowski et al. |
| 2001/0051761 A1 | 12/2001 | Khadem |
| 2001/0051802 A1 | 12/2001 | Woloszko et al. |
| 2002/0002349 A1 | 1/2002 | Flaherty et al. |
| 2002/0006961 A1 | 1/2002 | Katz et al. |
| 2002/0010384 A1 | 1/2002 | Shahidi et al. |
| 2002/0010426 A1 | 1/2002 | Clayman et al. |
| 2002/0016564 A1 | 2/2002 | Courtney et al. |
| 2002/0026155 A1 | 2/2002 | Mangosong |
| 2002/0029030 A1 | 3/2002 | Lurie et al. |
| 2002/0031941 A1 | 3/2002 | Cote et al. |
| 2002/0038130 A1 | 3/2002 | Adams |
| 2002/0055746 A1 | 5/2002 | Burke et al. |
| 2002/0062133 A1 | 5/2002 | Gilson et al. |
| 2002/0077852 A1 | 6/2002 | Ford et al. |
| 2002/0082558 A1 | 6/2002 | Samson et al. |
| 2002/0082583 A1 | 6/2002 | Lerner |
| 2002/0090388 A1 | 7/2002 | Humes et al. |
| 2002/0103459 A1 | 8/2002 | Sparks et al. |
| 2002/0107475 A1 | 8/2002 | Maginot |
| 2002/0116011 A1 | 8/2002 | Chung et al. |
| 2002/0116043 A1 | 8/2002 | Garibaldi et al. |

| | | | | | |
|---|---|---|---|---|---|
| 2002/0165521 A1 | 11/2002 | Cioanta et al. | 2005/0283221 A1 | 12/2005 | Mann et al. |
| 2003/0013985 A1 | 1/2003 | Saadat | 2005/0288549 A1 | 12/2005 | Mathis |
| 2003/0014008 A1 | 1/2003 | Jacques | 2005/0288759 A1 | 12/2005 | Jones et al. |
| 2003/0014036 A1 | 1/2003 | Varner et al. | 2006/0004286 A1 | 1/2006 | Chang et al. |
| 2003/0017111 A1 | 1/2003 | Rabito | 2006/0004323 A1 | 1/2006 | Chang et al. |
| 2003/0018291 A1 | 1/2003 | Hill et al. | 2006/0063973 A1 | 3/2006 | Makower et al. |
| 2003/0032942 A1 | 2/2003 | Theeuwes et al. | 2006/0067982 A1 | 3/2006 | Haapakumpu et al. |
| 2003/0040697 A1 | 2/2003 | Pass et al. | 2006/0074318 A1 | 4/2006 | Ahmed et al. |
| 2003/0069521 A1 | 4/2003 | Reynolds et al. | 2006/0085027 A1 | 4/2006 | Santin et al. |
| 2003/0069549 A1 | 4/2003 | MacMahon et al. | 2006/0095066 A1 | 5/2006 | Chang et al. |
| 2003/0073955 A1 | 4/2003 | Otawara | 2006/0106361 A1 | 5/2006 | Muni et al. |
| 2003/0073972 A1 | 4/2003 | Rosenman et al. | 2006/0107957 A1 | 5/2006 | Djupesland |
| 2003/0083608 A1 | 5/2003 | Evans et al. | 2006/0116749 A1 | 6/2006 | Willink et al. |
| 2003/0083613 A1 | 5/2003 | Schaer | 2006/0149310 A1 | 7/2006 | Becker |
| 2003/0100886 A1 | 5/2003 | Segal et al. | 2006/0161255 A1 | 7/2006 | Zarowski et al. |
| 2003/0109810 A1 | 6/2003 | Brennan et al. | 2006/0173291 A1 | 8/2006 | Glossop |
| 2003/0114732 A1 | 6/2003 | Webler et al. | 2006/0173382 A1 | 8/2006 | Schreiner |
| 2003/0120339 A1 | 6/2003 | Banik et al. | 2006/0190022 A1 | 8/2006 | Beyar et al. |
| 2003/0130598 A1 | 7/2003 | Manning et al. | 2006/0210605 A1 | 9/2006 | Chang et al. |
| 2003/0163154 A1 | 8/2003 | Miyata et al. | 2006/0211752 A1 | 9/2006 | Kohn et al. |
| 2003/0164952 A1 | 9/2003 | Deichmann et al. | 2006/0271024 A1 | 11/2006 | Gertner et al. |
| 2003/0171650 A1 | 9/2003 | Tartaglia et al. | 2007/0005094 A1 | 1/2007 | Eaton et al. |
| 2003/0181827 A1 | 9/2003 | Hojeibane et al. | 2007/0020196 A1 | 1/2007 | Pipkin et al. |
| 2003/0185872 A1 | 10/2003 | Kochinke | 2007/0049929 A1 | 3/2007 | Catanese III et al. |
| 2003/0208194 A1 | 11/2003 | Hovda et al. | 2007/0073269 A1 | 3/2007 | Becker |
| 2003/0209096 A1 | 11/2003 | Pandey et al. | 2007/0112358 A1 | 5/2007 | Abbott |
| 2003/0212446 A1 | 11/2003 | Kaplan et al. | 2007/0129751 A1 | 6/2007 | Muni et al. |
| 2003/0225329 A1 | 12/2003 | Rossner et al. | 2007/0135789 A1 | 6/2007 | Chang et al. |
| 2004/0015150 A1 | 1/2004 | Zadno-Azizi | 2007/0167682 A1 | 7/2007 | Goldfarb et al. |
| 2004/0018980 A1 | 1/2004 | Gurney et al. | 2007/0207186 A1 | 9/2007 | Scanlon et al. |
| 2004/0034311 A1 | 2/2004 | Mihalcik | 2007/0208252 A1 | 9/2007 | Makower |
| 2004/0043052 A1 | 3/2004 | Hunter et al. | 2007/0208301 A1 | 9/2007 | Evard et al. |
| 2004/0058992 A1 | 3/2004 | Marinello et al. | 2007/0233036 A1 | 10/2007 | Madpe |
| 2004/0064083 A1 | 4/2004 | Becker | 2007/0250105 A1 | 10/2007 | Ressemann et al. |
| 2004/0064105 A1 | 4/2004 | Capes et al. | 2007/0269385 A1 | 11/2007 | Yun et al. |
| 2004/0064150 A1 | 4/2004 | Becker | 2007/0293727 A1 | 12/2007 | Goldfarb et al. |
| 2004/0097788 A1 | 5/2004 | Mourlas et al. | 2007/0293946 A1 | 12/2007 | Gonzales et al. |
| 2004/0098017 A1 | 5/2004 | Saab et al. | 2008/0015540 A1 | 1/2008 | Muni et al. |
| 2004/0116958 A1 | 6/2004 | Gopferich et al. | 2008/0015544 A1 | 1/2008 | Keith et al. |
| 2004/0122471 A1 | 6/2004 | Toby et al. | 2008/0033519 A1 | 2/2008 | Burwell et al. |
| 2004/0127820 A1 | 7/2004 | Clayman et al. | 2008/0051804 A1 | 2/2008 | Cottler et al. |
| 2004/0158229 A1 | 8/2004 | Quinn | 2008/0082045 A1 | 4/2008 | Goldfarb et al. |
| 2004/0167440 A1 | 8/2004 | Sharrow | 2008/0097154 A1 | 4/2008 | Makower et al. |
| 2004/0167442 A1 | 8/2004 | Shireman et al. | 2008/0097239 A1 | 4/2008 | Chang et al. |
| 2004/0167443 A1 | 8/2004 | Shireman et al. | 2008/0097295 A1 | 4/2008 | Makower et al. |
| 2004/0181175 A1 | 9/2004 | Clayman et al. | 2008/0097400 A1 | 4/2008 | Chang et al. |
| 2004/0193073 A1 | 9/2004 | DeMello et al. | 2008/0097514 A1 | 4/2008 | Chang et al. |
| 2004/0193139 A1 | 9/2004 | Armstrong et al. | 2008/0097515 A1 | 4/2008 | Chang et al. |
| 2004/0230095 A1 | 11/2004 | Stefanchik et al. | 2008/0097516 A1 | 4/2008 | Chang et al. |
| 2004/0230131 A1 | 11/2004 | Kassab et al. | 2008/0103361 A1 | 5/2008 | Makower et al. |
| 2004/0230156 A1 | 11/2004 | Schreck et al. | 2008/0103521 A1 | 5/2008 | Makower et al. |
| 2004/0236231 A1 | 11/2004 | Knighton et al. | 2008/0119693 A1 | 5/2008 | Makower et al. |
| 2004/0249243 A1 | 12/2004 | Kleiner | 2008/0125046 A1 | 5/2008 | Deng et al. |
| 2004/0249267 A1 | 12/2004 | Gilboa | 2008/0125626 A1 | 5/2008 | Chang et al. |
| 2004/0254625 A1 | 12/2004 | Stephens et al. | 2008/0154250 A1 | 6/2008 | Makower et al. |
| 2004/0267347 A1 | 12/2004 | Cervantes | 2008/0154345 A1 | 6/2008 | Taylor |
| 2005/0027249 A1 | 2/2005 | Reifart et al. | 2008/0187098 A1 | 8/2008 | Gertner et al. |
| 2005/0043706 A1 | 2/2005 | Eaton et al. | 2008/0188870 A1 | 8/2008 | Andre et al. |
| 2005/0049486 A1 | 3/2005 | Urquhart et al. | 2008/0195041 A1 | 8/2008 | Goldfarb et al. |
| 2005/0055077 A1 | 3/2005 | Marco et al. | 2008/0208242 A1 | 8/2008 | Becker |
| 2005/0059931 A1 | 3/2005 | Garrison et al. | 2008/0208243 A1 | 8/2008 | Becker |
| 2005/0089670 A1 | 4/2005 | Large et al. | 2008/0215082 A1 | 9/2008 | Becker |
| 2005/0107720 A1 | 5/2005 | Burmeister et al. | 2008/0215083 A1 | 9/2008 | Becker |
| 2005/0107738 A1 | 5/2005 | Slater et al. | 2008/0228085 A1 | 9/2008 | Jenkins et al. |
| 2005/0113686 A1 | 5/2005 | Peckham | 2008/0234720 A1 | 9/2008 | Chang et al. |
| 2005/0113687 A1 | 5/2005 | Herweck et al. | 2008/0262508 A1 | 10/2008 | Clifford et al. |
| 2005/0113850 A1 | 5/2005 | Tagge | 2008/0262509 A1 | 10/2008 | Clifford et al. |
| 2005/0119590 A1 | 6/2005 | Burmeister et al. | 2008/0275483 A1 | 11/2008 | Makower et al. |
| 2005/0124856 A1 | 6/2005 | Fujikura et al. | 2008/0281156 A1 | 11/2008 | Makower et al. |
| 2005/0131316 A1 | 6/2005 | Flagle et al. | 2008/0287908 A1 | 11/2008 | Muni et al. |
| 2005/0143687 A1 | 6/2005 | Rosenblatt et al. | 2008/0319424 A1 | 12/2008 | Muni et al. |
| 2005/0182319 A1 | 8/2005 | Glossop | 2009/0017090 A1 | 1/2009 | Arensdorf et al. |
| 2005/0228260 A1 | 10/2005 | Burwell et al. | 2009/0028923 A1 | 1/2009 | Muni et al. |
| 2005/0228412 A1 | 10/2005 | Surti | 2009/0030274 A1 | 1/2009 | Goldfarb et al. |
| 2005/0234507 A1 | 10/2005 | Geske et al. | 2009/0047326 A1 | 2/2009 | Eaton et al. |
| 2005/0240147 A1 | 10/2005 | Makower et al. | 2009/0088677 A1 | 4/2009 | Cohen |
| 2005/0244472 A1 | 11/2005 | Hughes et al. | 2009/0088728 A1 | 4/2009 | Dollar et al. |
| 2005/0245906 A1 | 11/2005 | Makower et al. | 2009/0093823 A1 | 4/2009 | Chang et al. |
| 2005/0273132 A1 | 12/2005 | Shluzas et al. | 2009/0156980 A1 | 6/2009 | Eaton et al. |

| | | |
|---|---|---|
| 2009/0163890 A1 | 6/2009 | Clifford et al. |
| 2009/0187089 A1 | 7/2009 | Say et al. |
| 2009/0187098 A1 | 7/2009 | Makower et al. |
| 2009/0192492 A1 | 7/2009 | Eaton et al. |
| 2009/0198216 A1 | 8/2009 | Muni et al. |
| 2009/0227945 A1 | 9/2009 | Eaton et al. |
| 2009/0240112 A1 | 9/2009 | Goldfarb et al. |
| 2009/0240237 A1 | 9/2009 | Goldfarb et al. |
| 2009/0312745 A1 | 12/2009 | Goldfarb et al. |
| 2010/0087811 A1 | 4/2010 | Herrin et al. |
| 2010/0114066 A1 | 5/2010 | Makower et al. |
| 2010/0121308 A1 | 5/2010 | Muni et al. |
| 2010/0174308 A1 | 7/2010 | Chang et al. |
| 2010/0174366 A1 | 7/2010 | Avior |
| 2010/0198191 A1 | 8/2010 | Clifford et al. |
| 2010/0198302 A1 | 8/2010 | Shalev |
| 2010/0274188 A1 | 10/2010 | Chang et al. |
| 2010/0290244 A1 | 11/2010 | Nath |
| 2011/0166190 A1 | 7/2011 | Anderson et al. |

FOREIGN PATENT DOCUMENTS

| | | |
|---|---|---|
| CN | 2352818 | 12/1999 |
| DE | 03202878 | 8/1983 |
| DE | 04032096 | 4/1992 |
| DE | 04406077 | 9/1994 |
| DE | 08810044 | 11/1998 |
| DE | 29923582 | 12/2000 |
| DE | 10104663 | 8/2002 |
| DE | 10105592 | 8/2002 |
| EP | 0129634 | 1/1985 |
| EP | 0257605 | 3/1988 |
| EP | 0355996 | 2/1990 |
| EP | 0418391 | 3/1991 |
| EP | 0427852 | 5/1991 |
| EP | 0623582 | 11/1994 |
| EP | 0624349 | 11/1994 |
| EP | 0744400 | 11/1996 |
| EP | 0585757 | 6/1997 |
| EP | 0893426 | 1/1999 |
| EP | 1042998 | 10/2000 |
| EP | 1166710 | 1/2002 |
| EP | 1413258 | 4/2004 |
| EP | 1944053 | 7/2008 |
| FR | 2859377 | 3/2005 |
| FR | 2916144 | 11/2008 |
| GB | 2125874 | 3/1984 |
| GB | 2305174 | 4/1997 |
| JP | 53-067935 | 6/1978 |
| JP | 10-24098 | 1/1989 |
| JP | 3-503011 | 7/1991 |
| JP | 3-504935 | 10/1991 |
| JP | 4-221313 | 8/1992 |
| JP | 5-211985 | 8/1993 |
| JP | 6-277296 | 10/1994 |
| JP | 7-327916 | 12/1995 |
| JP | 8-317989 | 12/1996 |
| JP | 11-507251 | 6/1999 |
| JP | 2000-501634 | 2/2000 |
| JP | 2001-501846 | 2/2001 |
| JP | 2001-095815 | 4/2001 |
| JP | 2001-526077 | 12/2001 |
| JP | 2002-028166 | 1/2002 |
| JP | 2002-508214 | 3/2002 |
| JP | 2002-537908 | 11/2002 |
| JP | 2002-538850 | 11/2002 |
| JP | 2003-062080 | 3/2003 |
| JP | 2003-521327 | 7/2003 |
| JP | 2004-357728 | 12/2004 |
| JP | 2005-532869 | 11/2005 |
| RU | 2213530 | 10/2003 |
| SU | 1662571 | 7/1991 |
| WO | 90/11053 | 10/1990 |
| WO | 90/14865 | 12/1990 |
| WO | 91/17787 | 11/1991 |
| WO | 92/15286 | 9/1992 |
| WO | 92/22350 | 12/1992 |
| WO | 94/12095 | 6/1994 |
| WO | 96/29071 | 9/1996 |
| WO | 97/24161 | 6/1997 |
| WO | 99/24106 | 5/1999 |
| WO | 99/30655 | 6/1999 |
| WO | 99/32041 | 7/1999 |
| WO | 00/09192 | 2/2000 |
| WO | 00/23009 | 4/2000 |
| WO | 00/51672 | 9/2000 |
| WO | 00/53252 | 9/2000 |
| WO | 01/45572 | 6/2001 |
| WO | 01/54558 | 8/2001 |
| WO | 01/56481 | 8/2001 |
| WO | 01/70325 | 9/2001 |
| WO | 01/74266 | 10/2001 |
| WO | 01/97895 | 12/2001 |
| WO | 02/062269 | 8/2002 |
| WO | 03/049603 | 6/2003 |
| WO | 03/063703 | 8/2003 |
| WO | 03/105657 | 12/2003 |
| WO | 2004/006788 | 1/2004 |
| WO | 2004/018980 | 3/2004 |
| WO | 2004/026391 | 4/2004 |
| WO | 2004/082525 A2 | 9/2004 |
| WO | 2004/082525 A3 | 9/2004 |
| WO | 2005/018730 | 3/2005 |
| WO | 2005/077450 | 8/2005 |
| WO | 2005/089670 | 9/2005 |
| WO | 2005/117755 | 12/2005 |
| WO | 2006/034008 | 3/2006 |
| WO | 2006/078884 | 7/2006 |
| WO | 2006/107957 | 10/2006 |
| WO | 2006/116597 | 11/2006 |
| WO | 2006/118737 | 11/2006 |
| WO | 2006/135853 | 12/2006 |
| WO | 2007/111636 | 10/2007 |
| WO | 2007/124260 | 11/2007 |
| WO | 2008/036149 | 3/2008 |
| WO | 2008/045242 | 4/2008 |
| WO | 2008/051918 | 5/2008 |
| WO | 2008/134382 | 11/2008 |

OTHER PUBLICATIONS

SurgTrainer Product Information 2003, SurgTrainer, Ltd., Ibaraki, Japan.

Yamauchi, Y., et al., Development of a Silicone Model for Endoscopic Sinus Surgery, Proc. CARS 99, p. 1039 (1999).

Sawbones Catalog 2001, Pacific Research Laboratories, Inc., Vashon, Washington 98070, U.S.A.

Edmond et al., ENT Surgical Simulator, Nov. 1998.

Yamauchi, Y., et al., A Training System for Endoscopic Sinus Surgery With Skill Evaluation; Proc. CARS 99, p. 1191: 1039 (1999) (with accompanying poster presentation).

Argon Medical. Maxxim Medical. Ad for Sniper EliteTM Hydrophilic Ni-Ti Alloy Guidewire (2001).

Aust, R., et al 'The Functional Size of the Human Maxillary Ostium in Vivo' Acta. Otolaryn. (1978) vol. 78 pp. 432-435.

Baim, D.S., MD Grossman's Cardiac Catheterization, Angiography, and Intervention (2000) Lippincott Williams & Wilkins pp. 76, 84 & 214.

Barrett, S. 'Be Wary of Neurocranial Restructuring (NCR)' Chirobase (available at: http://www.chirobase.org/06DD/ncr.html) (Jul. 2003.).

Bartal, N. 'An Improved Stent for Use in the Surgical Management of Congenital Posterior Choanal Atresia' J. Laryngol. Otol. (1988) vol. 102 pp. 146-147.

Becker, A.E. 'Restenosis After Angioplasty' The Lancet (1988) vol. 331, No. 8584 p. 532.

Bellis, M. History of the Catheter—Balloon Catheter—Thomas Fogarty. http://inventors.about.com/library/inventors/blcatheter.htm?p=1.

Benninger et al. Adult Chronic Rhinosinusitis: Definitions, Diagnosis, Epidemiology, and Pathophysiology Arch Otolarygol Head and Neck Surg. (Sep. 2003) vol. 129 pp. S1-S32.

Bent et al. 'The Frontal Cell as a Cause of Frontal Sinus Obstruction' American Journal of Rhinology. (1994) vol. 8, No. 4 pp. 185.

Binner et al. 'Fibre-Optic Transillumination of the Sinuses: A Comparison of the Value of Radiography and Transillumination in Antral Disease' Clinical Otolaryngology. (1978) vol. 3 pp. 1-11.

Brown, C.L. et al 'Safety and Feasibility of Balloon Catheter Dilation of Paranasal Sinus Ostia: A Preliminary Investigation' Annals of Otology, Rhinology & Laryngology (2006) vol. 115, No. 4 pp. 293-299.

Bumm, P., H. Kaiser et al 'Cortizontherapie, Corticoide in Klinik and Praxis' Thieme, Stuggart (1992) pp. 390-401 [Summary of textbook].

Casiano et al. 'Endoscopic Lothrop Procedure: The University of Miami Experience' American Journal of Rhinology (1998) vol. 12, No. 5 pp. 335-339.

Casserly, I.P. et al Chapter 7. 'Guides and Wires in Percutaneous Coronary Intervention' Strategic Approaches in Coronary Intervention (2006) Lippincott Williams & Wilkins pp. 91-99.

Chien, Y.W. et al. Nasal Systemic Drug Delivery, Drugs and the Pharmaceutical Sciences (1989) Marcel Dekker, Inc. Chapter 3, pp. 39-88.

Cohen et al 'Endoscopic Sinus Surgery: Where we are and where we're going' Current Opinion in Otolaryngology & Head and Neck Surgery (2005) vol. 13 pp. 32-38.

Colla, A. et al 'Trihaloacetylated Enol Ethers-General Synthetic Procedure and Heterocyclic Ring Closure Reactions with Hydroxylamine' Synthesis. (Jun. 1991) pp. 483-486.

Costa, M.N. et al 'Endoscopic Study of the Intranasal Ostium in External Dacryocystorhinostomy Postoperative. Influence of Saline Solution and 5- Flurorouracil' Clinics. (2007) vol. 62, Issue 1 pp. 41-46. http://www.scielo.br/scielo.php?pid=S1807-59322007000100007&script=sci_arttext.

Cussler, E.L. *Diffusion: Mass Transfer in Fluid Systems* Cambridge University Press (1996) [Summary of textbook].

Davis, G.E. et al., 'A Complication From Neurocranial Restructuring' Arch Otolaryngology Head Neck Surg. (Apr. 2003) vol. 129 pp. 472-474.

Deutschmann, R. et al. 'A Contribution to the Topical Treatment of [Maxillary] Sinusitis Preliminary Communication' Stomat DDR 26, (1976) pp. 585-592.

Domb, A. et al *Handbook of Biodegradable Polymers* Harwood Academic Publishers (1997) [Summary of textbook].

Draf, W. 'Endonasal Micro-Endoscopic Frontal Sinus Surgery: the Fulda Concept' Op Tech Otolaryngol Head Neck Surg. (1991) vol. 2 pp. 234-240.

Edmond et al 'ENT Surgical Stimulator' Nov. 1998 Final Report Cooperative Agreement No. DAMD17-95-2-5023.

ENT Checklist; Physical Examination Performance Checklist [date of publication unknown].

Eremychev, V.A. 'Needles for Puncture and Drainage of the Maxillary Sinus' Meditsinskaya Tekhnika, No. 5 (1974) pp. 54-55.

Feldman, R.L. et al 'New Steerable, Ultra-Low-Profile, Fixed Wire Angioplasty Catheter: Initial Experience With the Cordis Orion™Steerable PTCA Balloon Catheter' Cathet. Cardiovasc. Diagn. (1990) vol. 19, No. 2 pp. 142-145.

Ford, C.N. 'A Multipurpose Laryngeal Injector Device' Otolaryngol. Head Neck Surg. (1990) vol. 103, No. 1 pp. 135-137.

Friedman, M. M.D., et al 'Frontal Sinus Surgery: Endoscopic Technique' Operative Techniques in Otolarynology-Head and Neck Surgery. (Jun. 2001) vol. 12, No. 2 pp. 60-65.

Friedman, et al 'Intraoperative and Postoperative Assessment of Frontal Sinus Patency by Transillumination' Laryngoscope. (Apr. 2000) vol. 110 pp. 683-684.

Friedman et al 'Middle Turbinate Medialization and Preservation in Endoscopic Surgery' Otolaryngol. Head Neck Surg. (2000) vol. 123, No. 1, Part 1. pp. 76-80.

Fung, M.K.T. 'How I Do It—Head and Neck and Plasic Surgery. A Targeted Problem and its Solution. Template for Frontal Osteoplastic Flap' Laryngoscope. (1986) vol. 96 pp. 578-579.

Gatot, A. et al., 'Early Treatment of Orbital Floor Fractures with Catheter Balloon in Children' Int. J. Pediatric Otorhinolaryngol (1991) vol. 21 pp. 97-101.

Gerus, I.I. et al 'β-Ethoxyvinyl Polyfluroroalkyl Ketones-Versatile Synthones in Fluoroorganic Chemistry' Journal of Fluorine Chemistry. (1994) vol. 69 pp. 195-198. Elsevier Science S.A.

Good, R.H. 'An Intranasal Method for Opening the Frontal Sinus Establishing the Largest Possible Drainage' Laryngoscope. (1908) vol. 18 pp. 266-274.

Gopferich 'Polymer Degradation and Erosion: Mechanisms and Applications' Eur. J. Pharm. Biophar. (1996) vol. 42 pp. 1-11.

Gorlov, D.V. et al 'Acylation of 2-Methoxypropene with Anhydrides and Halides of Perflurocarboxylic Acids in the Presence of Tertiary Amines' Russian Chemical Bulletin. (Sep. 1999) vol. 48 No. 9 pp. 1791-1792. Kluwer Academic/Plenum Publishers.

Gottman, et al. 'Balloon Dilatation in the Nasal Cavity and Paranasal Sinuses' CIRSE. (Sep. 25, 2004) pp. 1-27.

Gottman, et al. 'Balloon Dilatation of Recurrent Ostial Occlusion of the Front Sinus' Abstract No. B-04353. European Congress of Radiology. (Mar. 2, 2001).

Gottman, et al. 'Successful Treatment of Recurrent Post-Operative Frontal Sinus Stenoses by Balloon Dilatation' CIRSE. (Oct. 5, 2002).

Gupta, D. et al 'Dacryocystitis Secondary to an Iatrogenic Foreign Body in the Lacrimal Apparatus' Ear, Nose & Throat Journal (2009) http://findarticles.com/p/articles/mi_m0BUM/is_7_88/ai_n32428620/.

Hashim, et al 'Balloon Compression of the Intermaxillary Sinus for Intractable Post Traumatic Bleeding from the Maxillary Artery' Scandinavian Journal of Plastic and Reconstructive Surgery and Hand Surgery (1999) vol. 33 pp. 321-4.

Hojo, M. et al 'Electrophilic Substitutions of Olefinic Hydrogens II. Acylation of Vinyl Ethers and N Vinyl Amides' Chemistry Letters (1976) pp. 499-502.

Hopf, J.U.G. et al 'Miniature Endoscopes in Otorhinolaryngologic Applications' Min Invas Ther & Allied Technol. (1998) vol. 7, No. 3 pp. 209-218.

Hosemann, W. et al *A Dissection Course on Endoscopic Endonasal Sinus Surgery* (2005) Endo-Press, Tuttlingen pp. 4-37.

Hosemann, W. et al 'Endonasal Frontal Sinusotomy in Surgical Management of Chronic Sinusitis: A Critical Evaluation' American Journal of Rhinology (1997) vol. 11, No. 1 pp. 1-9.

Hosemann, M.E. et al 'Experimentelle Untersuchungen zur Wundheilung in den Nasennebenholhlen. II. Spontaner Wundschluss and medikamentose Effekte im standardisierten Wundmodell.' HNO 39 (1991) pp. 48-54.

Hosemann W.G. et al *Minimally Invasive Endonasal Sinus Surgery* Thieme, Stuttgart, New York (2000) [Summary of textbook].

Hosemann, M.E. et al 'Normal Wound Healing of the Paranasal Sinuses—Clinical and Experimental Investigations' Eur Arch Otorhinolaryngol. (1991) vol. 248 pp. 390-394.

Hosemann, W. et al 'Weiterbehandlung nach Nasennebenhohleneingriffen, Part 2: Theapeutische Maβnahmen' HNO akutell 7 (1999) pp. 291-302.

Hospital Corpsman Sickcall Screener's Handbook. Naval Hospital Great Lakes (Apr. 1999) http://www.brooksidepress.org/Products/Operationa.Medicine/DATA. 2001 pp. 1-6.

Hybels, R.L. 'Transillumination During Osteoplastic Frontal Sinusotomy' The Laryngoscope (Sep. 1981) vol. 91 pp. 1560.

Ijaduola, T.G.A. 'Use of a Foley Catheter for Short-Term Drainage in Frontal Sinus Surgery' The Journal of Laryngology and Otology. (1989) vol. 103 pp. 375-378.

Ingals, F. 'New Operation and Instruments for Draining the Frontal Sinus' Ann Otol Rhinol Laryngol. (1905) vol. 14 pp. 515-519.

Iro, H. et al 'A New Device for Frontal Sinus Endoscopy: First Clinical Report' Otolaryngol. Head Neck Surg. (2001) vol. 125 No. 6 pp. 613-616.

Jacobs, J.B. '100 Years of Frontal Sinus Surgery' Laryngoscope. (1997) vol. 107 pp. 1-36.

Kennedy, D.W., M.D. et al *Diseases of the Sinuses Diagnosis and Management* (Copyright 2001) by B.C. Decker Inc.

Khomutov, S.M. et al 'Dissolution of a Mixture of Steroids in Cyclodextrin Solutions: a Model Description' Pharmaceutical Chemistry Journal. (Nov. 2001) vol. 35, No. 11 pp. 627-629.

Kingdom, T.T. et al 'Image-Guided Surgery of the Sinuses: Current Technology and Applications' Otolaryngol. Clin. North Am. (Apr. 2004) vol. 37, No. 2 pp. 381-400.

Klossek, J.M. et al 'Local Safety of Intranasal Triamcinolone Acetonide: Clinical and Histological Aspects of Nasal Mucosa in the Long-Term Treatment of Perennial Allergic Rhinitis' Rhinology (2001) vol. 39, No. 1 pp. 17-22.

Kozlov et al 'Diagnosis and Treatment of Sinusitis by YAMIK Sinus Catheters' Rhinology (1996) vol. 34. pp. 123-124.

Kuhn, et al. 'The Agger Nasi Cell in Frontal Recess Obstruction: An Anatomic, Radiology and Clinical Correlation' Operative Techniques in Otolaryngology-Head and Neck Surgery (1991) vol. 2, No. 4 pp. 226-231.

Laliberte F. et al 'Clinical and Pathologic Methods to Assess the Long-Term Safety or Nasal Corticosteroids' Allergy (2000) vol. 55, No. 8 pp. 718-722.

Lang, E.V. et al 'Access Systems for Puncture at an Acute Angle' J. Vasc. Interv. Radiol. (1995) vol. 6, No. 5 pp. 711-713.

Lanza, D.C. 'Postoperative Care and Avoiding Frontal Recess Stenosis' International Advanced Sinus Symposium. General Session Abstracts. (1993) Jul. 21-24.

Large, G.C. 'Crystalline Tetracycline Hydrochloride in the Treatment of Acute and Chronic Maxillary Sinusitis' Canad. M. A. J. (1958) vol. 79 pp. 15-16.

Lund, V.J. 'Maximal Medical Therapy for Chronic Rhinosinusitis' Otolaryngol Clin N Am. (2005) vol. 38 pp. 1301-1310.

Maran, A.G.D. et al 'The Use of the Foley Catheter in the Tripod Fracture' J. Laryngol. Otol (1971) vol. 85, Issue 9 pp. 897-902.

May, M. et al 'Frontal Sinus Surgery: Endonasal Drainage Instead of an External Osteopolstic Approach' Op Tech Otolaryngo Head Neck Surgery (1995) vol. 6, No. 3 pp. 184-192.

Medtronic, xomed.com-MicroFrance Catalog Browser. http://www.xomcat.com/xomfrance/index.php?zone=both&cat=18&sub=58&prodline=1272 (Dec. 31, 2003) pp. 1-2.

Mehan, V.K. et al 'Coronary Angioplasty through 4 French Diagnostic Catheters' Cathet. Cardiovasc. Diagn. (1993) vol. 30, No. 1 pp. 22-26.

Mellor, J.M. et al 'Synthesis of Trifluromethylnaphthalenes' Tetrahedron (2000) vol. 56 pp. 10067-10074. Elseview Science Ltd.

Metson, R. et al 'Endoscopic Treatment of Sphenoid Sinusitis' Otolaryngol. Head Neck Surg. (1996) vol. 114, No. 6 pp. 736-744.

Metson, R. 'Holmium: YAG Laser Endoscopic Sinus Surgery: A Randomized Controlled Study' Laryngoscope (Jan. 1996) vol. 106, Issue 1, Supplement 77 pp. 1-18.

Miller et al. 'Management of Fractures of the Supraorbital Rim' Journal of Trauma (Jul. 1978) vol. 18, No. 7 pp. 507-512.

Min, Y-G et al. 'Mucociliary Activity and Histopathology of Sinus Mucosa in Experimental Maxilary Sinusitis: A Comparison of Systemic Administration of Antibiotic and Antibiotic Delivery by Polylactic Acid Polymer' Laryngoscope (Aug. 1995) vol. 105 pp. 835-842.

Mols, B. 'Moveable Tool Tip for Keyhole Surgery' Delft Outlook (2005) vol. 3 pp. 13-17.

Mooney, M.R. et al 'Monorail™ Piccolino Catheter: A New Rapid Exchange/Ultralow Profile Coronary Angioplasty System' Cathet. Cardiovasc. Diagn. (1990) vol. 20, No. 2 pp. 114-119.

Moriguchi, T. et al 'Addition-Elimination Reaction in the Trifluoroacetylation of Electron-Rich Olefins' J. Org. Chem. (1995) vol. 60, No. 11 pp. 3523-3528. American Chemical Society.

Park, K. et al *Biodegreadable Hydrogels for Medicinal Substance Delivery* (1993) Technomic Publishing Inc. Lancaster.

Piccirillo, J.F. et al 'Psychometric and Clinimetric Validity of the 20-Item Sino-Nasal Outcome Test (SNOT-20)' Otolaryngol. Head Neck Surg (2002) vol. 126, No. 1 pp. 41-47.

Piers, et al 'A Flexible Distal Tip with Two Degrees of Freedom for Enhanced Dexterity in Endoscopic Robot Surgery' Proceedings 13th Micromechanics Europe Workshop (2002) pp. 271-274.

Podoshin, L. et al 'Balloon Technique for Treament of Frontal Sinus Fractures' The Journal of Laryngology & Otology (1967), vol. 81. pp. 1157-1161.

Pownell, P.H. et al 'Diagnostic Nasal Endoscopy' Plastic & Reconstructive Surgery (1997) vol. 99, Iss. 5 pp. 1451-1458.

Prince et al 'Analysis of the Intranasal Distribution of Ointment' J Otolaryngol. (1997) vol. 26 pp. 357-360.

Ramsdale, D.R. *Illustrated Coronary Intervention A case-oriented approach* (2001) Martin Dunitz Ltd. pp. 1-5.

Ritter, F.N. et al *Atlas of Paranasal Sinus Surgery* (1991) Igaku-Shoin Medical Pub. pp. 1-81.

Robison, J. Mathews, M.D. 'Pressure Treatment of Maxillary Sinusitis' J.A.M.A. (May 31, 1952) pp. 436-440.

Robison, J. Mathews, M.D. 'Pressure Treatment of Purulent Maxillary Sinusitis' Texas State Journal of Medicine. (May 1951) pp. 281-288.

Sama, A. et al 'Current Opinions on the Surgical Management of Frontal Sinus Disease' ENT News. www.pinpointmendical.com/ent-news (2009) vol. 17 No. 6 pp. 60-63.

Sanborn, T.A., et al 'Percutaneous Endocardial Transfer and Expression of Genes to the Myocardium Utilizing Fluropscopic Guidance' Catheter Cardiovasc. Interv. (2001) vol. 52, No. 2 pp. 260-266.

*Sawbones Catalog* 2001, Pacific Research Laboratories, Inc., Vashon, Washington 98070 USA.

Saxon, R.R., et al 'Technical Aspects of Accessing the Portal Vein During the TIPS Procedure' J. Vasc. Interv. Radiol. (1997) vol. 8, No. 5 pp. 733-744.

Schaefer, S.D., M.D. *Rhinology and Sinus Disease A Problem-Oriented Approach* (Copyright 1988) by Mosby, Inc.

Schneider. Pfizer Ad for Softip [date of publication unknown].

Shah, N.J. et al 'Endoscopic Pituitary Surgery—A Beginner's Guide' Indian Journal of Otolaryngology and Head and Neck Surgery (2004) vol. 56, No. 1 pp. 71-78.

Shah, N.J. 'Functional Endoscopic Sinus Surgery' (1999); found at www.bhj.org/journal/1999_4104_oct99/sp_659.htm.

Single-Pole and Multi-Pole Lightguides for UV Spot Light Curing Systems. http://www.dymax.com/products/curing_equipment/lightguids/light. (2004) pp. 1-2.

Sobol, et al 'Sinusitis, Maxillary, Acute Surgical Treatment.' eMedicine. Retrieved from the Internet: <<http://emedicine.medscape.com/article/862030-print>> (Nov. 16, 2010) pp. 1-11.

St. Croix, et al 'Genes Expressed in Human Tumor Endothelium' Science (May 15 2000) vol. 289 pp. 1197-1202.

Stammberger H. 'Komplikationen entzundlicher Nasennebenhohlenerkrankungen eischließlich iatrogen bedingter Komplikationen.' Eur Arch Oti-Rhino-Laryngol Suppl. (Jan. 1993) pp. 61-102.

Stammberger, et al 'Special Endoscopic Anatomy of the Lateral Nasal Wall and Ethmoidal Sinuses' Functional Endoscopic Sinus Surgery. (1991) Ch. 3, pp. 49-87.

Strohm et al Die Behandlung von Stenosen der oberen Luftwege mittels rontgenologisch gesteuerter Ballondilation (Sep. 25, 1999).

Strohm, et al 'Le Traitement Des Stenoses Voies Aeriennes Superieures Par Dilation Au Balloon' Sep. 25, 1999.

Strohm, et al 'Treatment of the Stenoses of the Upper Air Routes by Balloon Dilation' Sudwestdeutscher (Sep. 25, 1999) Abstract 45 pp. 1-3.

SurgTrainer Product Information 'Incisive Human Nasal Model for ESS Training' Surg Trainer, Ltd. Ibaraki, Japan (2004) http://www1.accsnet.ne.jp/~juliy/st/en/partslist.html.

Tabor, M.H. et al 'Symptomatic Bilateral Nasolacrimal Duct Cysts in a Newborn-Rhinoscopic Clinic' Ear, Nost & Throat Journal (2003) http://findarticles.com/p/articles/mi_m0BUM/is_2_82/ai_98248244 pp. 1-3.

Tarasov, D.I. et al. 'Application of Drugs Based on Polymers in the Treatment of Acute and Chronic Maxillary Sinusitis' Vestn Otorinolaringol. (1978) vol. 6 pp. 45-47.

Terumo. Medi-Tech. Boston Scientific. (1993) Ad for Glidewire.

The Operating Theatre Journal (www.otjonline.com) 'Disposable Medical Device for Wound Disclosure/The Tristel Purple Promotion—A Collaboration between Tristel plc and Karl Storz Endoscopy (UK) Ltd.' pp. 4 [retrieved on Nov. 30, 2010]. Retrieved from the Internet.

Weber, R. et al 'Endonasale Stirnhohlenchirugie mit Langzeiteinlage eines Platzhalters' Laryngol. Rhinol. Otol. (1997) vol. 76 pp. 728-734. (English Abstract).

Weber, R. et al 'Videoendscopic Analysis of Nasal Steroid Distribution' Rhinology (1999) vol. 37 pp. 69-73.

Weiner, R.I., D.O. et al 'Development and Application of Transseptal Left Heart Catheterization' Cathet. Cardiovasc. Diagn. (1988) vol. 15, No. 2 pp. 112-120.

Wiatrak, B.J. et al 'Unilateral Choanal Atresia: Initial Presentation and Endoscopic Repair' International Journal of Pediatric Otorhinolaryngology (1998) vol. 46 pp. 27-35.

Woog, et al. 'Paranasal Sinus Endoscopy and Orbital Fracture Repair' Arch Ophthalmol. (May 1998) vol. 116 pp. 688-691.

Wormald, P.J. et al 'The 'Swing-Door' Technique for Uncinectomy in Endoscopic Sinus Surgery' the Journal of Laryngology and Otology (1998) vol. 112 pp. 547-551.
Xomed-Treace. Bristol-Myers Squibb. Ad for Laser Shield II. Setting the Standards for Tomorrow [date of publication unknown].
Yamauchi, Y. et al 'Development of a Silicone Model for Endoscopic Sinus Surgery' proc International Journal of Computer Assisted Radiology and Surgery (1999) vol. 99 pp. 1039.
Yamauchi, Y. et al 'A Training System for Endoscopic Sinus Surgery with Skill Evaluation' Computer Assisted Radiology and Surgery (2001) with accompanying copy of poster presentation.
Yanagisawa et al 'Anterior and Posterior Fontanelles.' Ear, Nose & Throat Journal (2001) vol. 80. p. 10-12.
Zimarino, M., MD et al 'Initial Experience with the Europass™: A New Ultra-Low Profile Monorail Balloon Catheter' Cathet. Cardiovasc. Diagn. (1994) vol. 33, No. 1 pp. 76-79.
http://www.invotec.net/rhinology/ksplint.html. K-Splint Internal Nasal Splints; Jan. 25, 2007
http://www.doylemedical.com/nasalsplints.htm; Doyle Nasal Splints; Jan. 25, 2007.
http://www.technologyforlife.com.au/ent/nasal.html; Nasal Surgery and Accessories; Jan. 25, 2007.
EP Communication dated Sep. 4, 2008 re: EP 05773189.
EP Communication dated Jun. 19, 2009 re: EP 05773189.
Examination Report dated Feb. 22, 2006 re: 02716734.5.
Examination Report dated Feb. 8, 2007 re: 02716734.5.
Examiners First Report dated Apr. 8, 2010 re: AU2005274794.
European Search Report and Search Opinion dated Sep. 11, 2009 from EP06815174.
European Search Report dated Sep. 27, 2011 re: EP10182961.
European Search Report dated Sep. 29, 2011 re: EP10182893.
International Preliminary Report on Patentability dated Aug. 25, 2006 from PCT/US05/25371.
International Preliminary Report on Patentability dated Oct. 4, 2007 from PCT/US06/002004.
International Preliminary Report on Patentability dated Nov. 27, 2008 from PCT/US07/11449.
International Preliminary Report on Patentability dated Apr. 16, 2009 from PCT/US07/021170.
International Preliminary Report on Patentability dated May 14, 2009 from PCT/US06/36960.
International Preliminary Report on Patentability dated Oct. 22, 2009 from PCT/US08/059786.
International Preliminary Report on Patentability dated Nov. 5, 2009 from PCT/US08/061343.
International Search Report dated May 23, 2002 from PCT/EP02/01228.
International Search Report dated Jun. 3, 2002 from PCT/EP02/01228.
International Search Report and Written Opinion dated Apr. 10, 2006 from PCT/US05/25371.
International Search Report dated May 8, 2007 from PCT/US2006/16026.
International Search Report and Written Opinion dated Aug. 17, 2007 from PCT/US05/13617.
International Search Report and Written Opinion dated Aug. 29, 2007 from PCT/US06/002004.
International Search Report dated Sep. 25, 2007 from PCT/US06/37167.
International Search Report dated Oct. 19, 2007 from PCT/US07/03394.
International Search Report and Written Opinion dated May 29, 2008 from PCT/US07/021170.
International Search Report dated May 29, 2008 from PCT/US07/21922.
International Search Report and Written Opinion dated Jul. 1, 2008 from PCT/US06/22745.
International Search Report dated Jul. 3, 2008 from PCT/US2006/029695.
International Search Report dated Jul. 7, 2008 from PCT/US07/16213.
International Search Report dated Jul. 8, 2008 from PCT/US07/11474.
International Search Report and Written Opinion dated Jul. 17, 2008 from PCT/US06/36960.
International Search Report and Written Opinion dated Jul. 21, 2008 from PCT/US05/33090.
International Search Report dated Aug. 25, 2008 from PCT/US2008/000911.
International Search Report dated Sep. 10, 2008 dated PCT/US07/16212.
International Search Report and Written Opinion dated Sep. 12, 2008 from PCT/US07/16214.
International Search Report and Written Opinion dated Sep. 17, 2008 from PCT/US08/059786.
International Search Report and Written Opinion dated Sep. 17, 2008 from PCT/US08/061343.
International Search Report and Written Opinion dated Oct. 1, 2008 from PCT/US07/11449.
International Search Report dated Oct. 15, 2008 from PCT/US2008/061048.
International Search Report dated Nov. 30, 2009 re: PCT/US2009/057203.
International Search Report from PCT Application No. PCT/US2009/057203 dated Nov. 30, 2009 as issued by the European Patent Office as searching authority.
International Search Report dated Dec. 10, 2009 re: PCT/US2009/052236.
International Search Report dated Dec. 16, 2009 re: PCT/US2009/050800.
International Search Report dated Mar. 31, 2010 re: PCT/US2009/069143.
International Search Report dated Jul. 8, 2010 re: PCT/US2010/027837.
International Search Report dated Oct. 6, 2010 re: PCT/US2010/040548.
International Search Report dated Mar. 25, 2011 re: PCT/US2010/062161.
International Search Report dated Mar. 28, 2011 re: PCT/US2010/061850.
International Search Report dated Mar. 31, 2011 re: PCT/US2010/060898.
International Search Report dated Aug. 9, 2011 re: PCT/US2011/038751.
International Search Report dated May 18, 2012 re: PCT/US2011/052321.
Partial European Search Report dated Sep. 20, 2007 re: 07252018.
Partial European Search Report dated Mar. 25, 2008 re: 07252018.
Partial International Search Report dated Feb. 7, 2012 re: PCT/US2011/052321.
Supplemental European Search Report dated Jun. 2, 2008 re: EP05773189.
Supplemental European Search Report dated Jul. 1, 2009 re: EP06815285.
Supplemental European Search Report dated Jan. 29, 2010 from EP07836108.
Supplemental European Search Report dated Feb. 2, 2010 re: EP07836109.
Supplemental European Search Report dated Feb. 17, 2010 re: EP07836110.
Supplemental European Search Report dated Mar. 1, 2010 re: EP05778834.
Supplemental European Search Report dated Mar. 16, 2010 from EP06718986.
Supplemental European Search Report dated Jun. 22, 2010 re: EP06784759.
Supplemental European Search Report dated Sep. 23, 2010 re: EP08746715.
Supplemental Partial European Search Report dated Nov. 19, 2010 re: EP06751637.
Supplemental European Search Report dated Jan. 28, 2011 re: 07777004.
Supplemental European Search Report dated Mar. 31, 2011 re: EP05798331.
Supplemental European Search Report dated Aug. 30, 2011 re: EP06800540.

Supplemental European Search Report dated Sep. 29, 2011 re: EP07750248.
U.S. Appl. No. 10/259,300, filed Sep. 30, 2002.
U.S. Appl. No. 10/259,630, filed Sep. 30, 2002.
U.S. Appl. No. 10/470,881, filed Feb. 4, 2004.
U.S. Appl. No. 10/829,917, filed Apr. 21, 2004.
U.S. Appl. No. 10/912,578, filed Aug. 4, 2004.
U.S. Appl. No. 10/944,270, filed Sep. 17, 2004.
U.S. Appl. No. 11/037,548, filed Jan. 18, 2005.
U.S. Appl. No. 11/116,118, filed Apr. 26, 2005.
U.S. Appl. No. 11/150,847, filed Jun. 10, 2005.
U.S. Appl. No. 11/193,020, filed Jul. 29, 2005.
U.S. Appl. No. 11/234,395, filed Sep. 23, 2005.
U.S. Appl. No. 11/347,147, filed Feb. 2, 2006.
U.S. Appl. No. 11/355,512, filed Feb. 16, 2006.
U.S. Appl. No. 11/436,892, filed May 17, 2006.
U.S. Appl. No. 11/436,897, filed May 17, 2006.
U.S. Appl. No. 11/438,090, filed May 18, 2006.
U.S. Appl. No. 11/522,497, filed Sep. 15, 2006.
U.S. Appl. No. 11/527,773, filed Sep. 25, 2006.
U.S. Appl. No. 11/544,009, filed Oct. 4, 2006.
U.S. Appl. No. 11/647,530, filed Dec. 27, 2006.
U.S. Appl. No. 11/648,159, filed Dec. 29, 2006.
U.S. Appl. No. 11/655,794, filed Jan. 18, 2007.
U.S. Appl. No. 11/725,151, filed Mar. 15, 2007.
U.S. Appl. No. 11/789,704, filed Apr. 24, 2007.
U.S. Appl. No. 11/789,705, filed Apr. 24, 2007.
U.S. Appl. No. 11/803,695, filed May 14, 2007.
U.S. Appl. No. 11/925,540, filed Oct. 26, 2007.
U.S. Appl. No. 11/926,326, filed Oct. 29, 2007.
U.S. Appl. No. 11/926,565, filed Oct. 29, 2007.
U.S. Appl. No. 11/928,097, filed Oct. 30, 2007.
U.S. Appl. No. 12/011,100, filed Jan. 23, 2008.
U.S. Appl. No. 12/100,361, filed Apr. 9, 2008.
U.S. Appl. No. 12/117,582, filed May 8, 2008.
U.S. Appl. No. 12/117,672, filed May 8, 2008.
U.S. Appl. No. 12/117,961, filed May 9, 2008.
U.S. Appl. No. 12/118,931, filed May 12, 2008.
U.S. Appl. No. 12/120,902, filed May 15, 2008.
U.S. Appl. No. 12/122,884, filed May 19, 2008.
U.S. Appl. No. 12/340,226, filed Dec. 19, 2008.
U.S. Appl. No. 12/341,602, filed Dec. 22, 2008.
U.S. Appl. No. 12/502,101, filed Jul. 13, 2009.
U.S. Appl. No. 60/844,874, filed Sep. 15, 2006.
U.S. Appl. No. 60/922,730, filed Apr. 9, 2007.
U.S. Appl. No. 61/052,413, filed May 12, 2008.
U.S. Appl. No. 61/084,949, filed Jul. 30, 2008.
USPTO Office Action dated Sep. 16, 2005 in U.S. Appl. No. 10/259,300.
USPTO Office Action dated Jul. 7, 2006 in U.S. Appl. No. 10/259,300.
USPTO Office Action dated Feb. 13, 2007 in U.S. Appl. No. 10/259,300.
USPTO Office Action dated May 29, 2007 in U.S. Appl. No. 10/912,578.
USPTO Office Action dated Oct. 9, 2007 in U.S. Appl. No. 10/259,300.
USPTO Office Action dated Oct. 18, 2007 in U.S. Appl. No. 11/037,548.
USPTO Office Action dated Nov. 14, 2007 in U.S. Appl. No. 10/912,578.
USPTO Office Action dated Nov. 28, 2007 in U.S. Appl. No. 11/234,395.
USPTO Office Action dated Dec. 6, 2007 in U.S. Appl. No. 11/037,548.
USPTO Office Action dated Dec. 10, 2007 in U.S. Appl. No. 10/912,578.
USPTO Office Action dated Jan. 24, 2008 in U.S. Appl. No. 10/259,300.
USPTO Office Action dated Apr. 9, 2008 in U.S. Appl. No. 11/037,548.
USPTO Office Action dated Sep. 12, 2008 in U.S. Appl. No. 10/829,917.
USPTO Office Action dated Oct. 6, 2008 in U.S. Appl. No. 10/259,300.
USPTO Office Action dated Oct. 29, 2008 in U.S. Appl. No. 11/347,147.
USPTO Office Action dated Nov. 7, 2008 in U.S. Appl. No. 10/944,270.
USPTO Office Action dated Nov. 17, 2008 in U.S. Appl. No. 10/829,917.
USPTO Office Action dated Nov. 17, 2008 in U.S. Appl. No. 12/117,582.
USPTO Office Action dated Nov. 17, 2008 in U.S. Appl. No. 12/118,931.
USPTO Office Action dated Nov. 25, 2008 in U.S. Appl. No. 12/117,961, filed May 9, 2008.
USPTO Office Action dated Dec. 5, 2008 in U.S. Appl. No. 12/120,902, filed May 15, 2008.
USPTO Office Action dated Jan. 28, 2009 in U.S. Appl. No. 10/944,270.
USPTO Office Action dated Feb. 4, 2009 in U.S. Appl. No. 11/347,147.
USPTO Office Action dated Mar. 3, 2009 in U.S. Appl. No. 12/117,582.
USPTO Office Action dated Mar. 4, 2009 in U.S. Appl. No. 12/118,931.
USPTO Office Action dated Mar. 17, 2009 in U.S. Appl. No. 11/690,127.
USPTO Office Action dated Mar. 18, 2009 in U.S. Appl. No. 10/829,917.
USPTO Office Action dated Mar. 23, 2009 in U.S. Appl. No. 11/804,309.
USPTO Office Action dated Mar. 23, 2009 in U.S. Appl. No. 11/926,326.
USPTO Office Action dated Apr. 21, 2009 in U.S. Appl. No. 10/944,270.
USPTO Office Action dated Jul. 30, 2009 in U.S. Appl. No. 12/118,931.
USPTO Office Action dated Aug. 6, 2009 in U.S. Appl. No. 11/347,147.
USPTO Office Action dated Aug. 6, 2009 in U.S. Appl. No. 12/117,582.
USPTO Office Action dated Aug. 6, 2009 in U.S. Appl. No. 12/117,961.
USPTO Office Action dated Aug. 28, 2009 in U.S. Appl. No. 11/150,847.
USPTO Office Action dated Oct. 21, 2009 in U.S. Appl. No. 12/120,902.
USPTO Office Action dated Nov. 9, 2009 in U.S. Appl. No. 10/829,917.

* cited by examiner

APPARATUS AND METHOD FOR SIMULATED INSERTION AND POSITIONING OF GUIDEWARES AND OTHER INTERVENTIONAL DEVICES

FIELD OF THE INVENTION

The present invention relates generally to the fields of medicine and surgery and more particularly to devices and methods useable for training physicians and other personnel in the art of inserting and positioning guidewires, catheters, scopes and other medical or surgical devices.

BACKGROUND

A variety of medical and surgical procedures involve the insertion, navigation and placement of guidewires, catheters, scopes and other devices that are used to perform therapeutic or diagnostic procedures at intracorporeal treatment sites (e.g., e.g., within a vessel, cavity or passageway of the body). In many of these procedures, the guidewire, catheter, scope or other device must be carefully advanced through tortuous or branched body passages (e.g., nasal passages, blood vessels, gastrointestinal tract, biliary tree, urinary tract, etc.) and/or around existing anatomical structures, in order to reach an intended location. In some cases, the physician-in-training may be able to alter the shape of the device as it is advanced though the body passageways (e.g., as in the case of a steerable or deflectable guidewire, catheter, scope or other device). In other cases, the device may be of a substantially fixed configuration (e.g., straight or curved). In either event, the physician-in-training must learn techniques for pre-shaping (if necessary), advancing and navigating such devices through the available body passageways, around certain anatomical structures and to their intended intracorporeal locations.

In some cases, anatomical models have been used for training physicians or other health professionals in the insertion, navigation, positioning and/or use of guidewires, catheters, scopes or other devices. Such uses of anatomical models can sometimes enable physicians-in-training and other professions-in-training to gain initial experience in performing certain procedures or techniques in a relaxed, non-clinical setting before proceeding to more challenging work in cadavers, laboratory animals or actual human patients.

One particular anatomical model that has been used for training surgeons in the performance of endoscopic sinus surgery is the SurgTrainer™ Human Nasal Model for Endonasal Surgery Training available from SurgTrainer, Ltd., 4-4-21, Kasuga, Tsukuba City, Ibaraki 305-0821 Japan. Also see, see, Yamauchi Y, Yamashita J, Mochimaru M, Fukui Y, Niikura M, Uno H, Yokoyama K, "Development of a Silicone Model for Endoscopic Sinus Surgery," proc CARS 99, p. 1039, 1999). This device generally includes a head-shaped housing into which various anatomical inserts may be interchangeably inserted and a soft plastic covering representing the skin and soft tissue structures of the patient's face. The interchangeable inserts represent various bone/sinus configurations representative of pathological conditions and, in at least some cases, are designed to be incised, drilled or cut by the surgeon undergoing training. This model is purported to be x-ray and CT compatible and may be used in conjunction with image guided surgical systems. However, devices such as the SurgTrainer™ Human Nasal Model for Endonasal Surgery Training may be less than optimal for training physicians in the performance of newer, less traumatic endonasal and sinus procedures. For example, new catheter-based procedures have been developed by Acclarent, Inc. of Menlo Park, Calif. for the performance of less traumatic Sinus and endonasal surgeries. These new procedures include, but are not limited to, uncinate-sparing procedures, uncinate-sparing ethmoidotmy procedures and implantation of drug delivery devices for treatment of paranasal sinusitis, using various catheters, instruments and advanced imaging techniques (Acclarent, Inc., Menlo Park, Calif.). Examples of these new devices, systems and methods are described in incorporated U.S. patent application Ser. Nos. 10/829,917 entitled Devices, Systems and Methods for Diagnosing and Treating Sinusitis and Other Disorders of the Ears, Nose and/or Throat; 10/944,270 entitled Apparatus and Methods for Dilating and Modifying Ostia of Paranasal Sinuses and Other Intranasal or Paranasal Structures; 11/116,118 entitled Methods and Devices for Performing Procedures Within the Ear, Nose, Throat and Paranasal Sinuses filed Apr. 26, 2005 and 11/150,847 filed Jun. 10, 2005, of which this application is a continuation-in-part. Catheter-based procedures are performed using various types of guidance including but not limited to C-arm fluoroscopy, transnasal endoscopy, intraoperative CT scan guidance, optical image guidance and/or electromagnetic image guidance.

Applicant has previously invented a device that may be used for simulated insertion and positioning of a working device (e.g., a balloon catheter) at a desired treatment site (e.g., within the ostium of a paranasal sinus). This device includes an indicator apparatus that provides an indication of when the working device has been used to cause some particular effect without causing substantial dismantling or destruction of the anatomical model. The indicator apparatus may indicate either a desired effect (e.g., the intended therapeutic or diagnostic effect of the working device) or an undesired effect (e.g., a complication, side effect, error, mistake or untoward effect) resulting from use of the working device. This device is described in co-pending U.S. patent application Ser. No. 11/527,773 entitled Anatomical Models and Methods for Training and Demonstration of Medical Procedures, the entire disclosure of which is expressly incorporated herein by reference.

There remains a need in the art for the development of additional devices and methods useable for training physicians and other health professionals in the insertion, navigation, placement and use of guidewires, catheters, scopes and other medical or surgical devices.

SUMMARY OF THE INVENTION

The present invention provides apparatus and methods useable for training physicians and other personnel in the art of inserting and positioning guidewires, catheters, scopes and other medical or surgical devices.

In accordance with one embodiment of the invention, there is provided an apparatus useable for simulated insertion and positioning of a medical or surgical device. This apparatus comprises a) a substantially flat first panel having a top surface, a bottom surface and at least one side surface; b) at least one simulated body opening (e.g., natural body opening, puncture site, incision, etc.) formed in a side surface of the first panel; c) at least one primary passageway extending inwardly from the simulated body opening; and d) a window through which an operator may view the medical or surgical device as it is inserted through the simulated body opening and advanced through at least the primary passageway. In some embodiments, the window may comprise a substantially transparent second panel attached (e.g., a clear plastic top panel) may be placed in substantial juxtaposition to the top or bottom surface of the first panel and a third panel (e.g., an opaque bottom panel) may be positioned in substantial juxtaposition to the other side of the first panel. One or more secondary passageway(s) may branch off of the primary passageway(s), one or more tertiary passageway(s) may branches off of the secondary passageway(s) and 1 or more additional passageways may branch off of any of the other passageway(s). Additionally, one or more simulated body cavities may be accessible through certain of the passageway(s). Simulated anatomical structures, such as anatomical processes or projections, organs, bones, etc., may be located adjacent to passageway(s) and/or body cavities. The passageway(s) may be straight, curved or tortuous and may mimic the anatomical configuration(s) (normal or anomalous) of actual body passages such as the nasal passages, nasal meatus, frontal tract, trachea, esophagus, duct, etc.). Similarly, the simulated body cavities may be shaped to correspond to the anatomical configuration(s) (normal or anomalous) of actual body cavities (e.g., paranasal sinuses).

Further in accordance with the invention, there is provided a method for using an apparatus of the above-summarized type, wherein an operator inserts one or more medical or surgical devices through one or more of the simulated body openings and advances such medical or surgical devices through one or more passageway(s). In some cases, the device(s) may be advanced into a simulated body cavity. The types of medical or surgical device(s) used may include, but are not limited to, catheters, guidewires, scopes and/or other working devices (e.g., dilation catheters, balloon catheters, atherectomy catheters, implantable devices, implantable substance delivery devices, etc.

Further aspects and details of the present invention will be understood upon reading of the detailed description and examples set forth herebelow.

BRIEF DESCRIPTION OF THE DRAWINGS

FIG. 2A is a side view of the apparatus of FIG. 1A.

DETAILED DESCRIPTION

The following detailed description, the accompanying drawings are intended to describe some, but not necessarily all, examples or embodiments of the invention. The contents of this detailed description do not limit the scope of the invention in any way.

Figure 1:
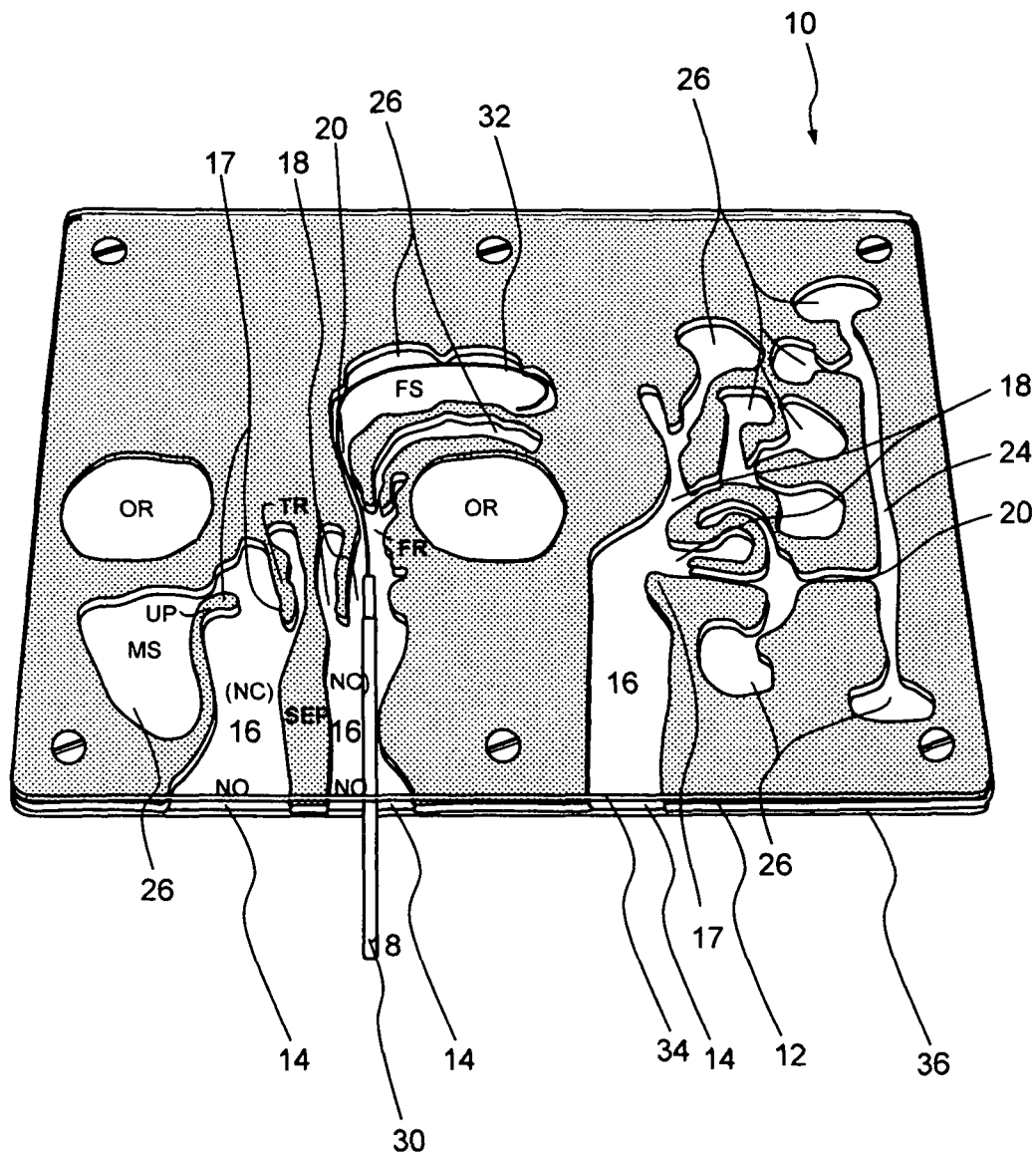
FIG. 1 is a perspective view of one embodiment of an apparatus of the present invention.
Figure 2:
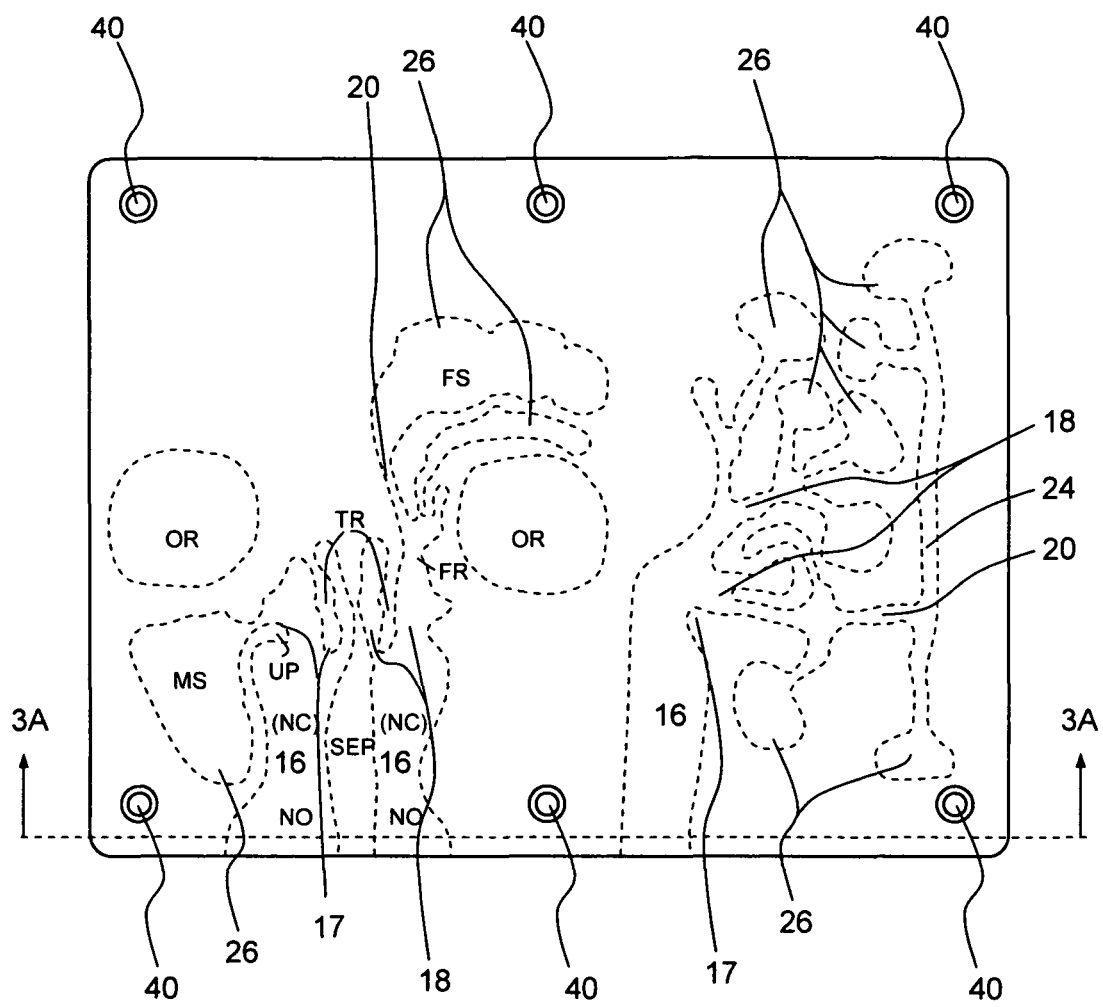
FIG. 2 is a top plan view of the apparatus of FIG. 1 having a guide and guidewire operatively inserted therein.
Figure 2:
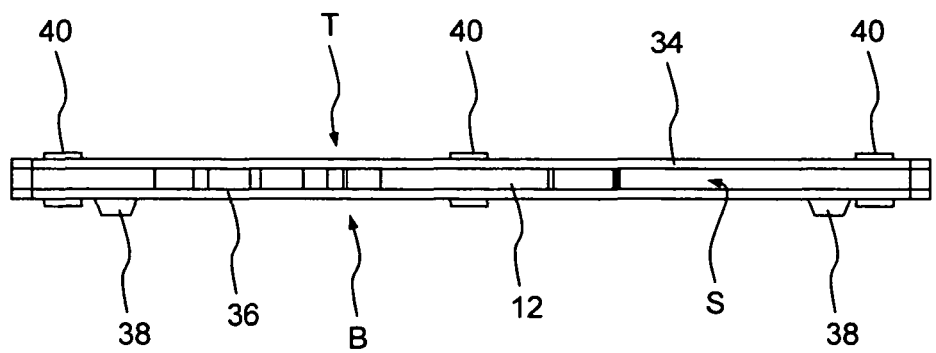
Figure 3:
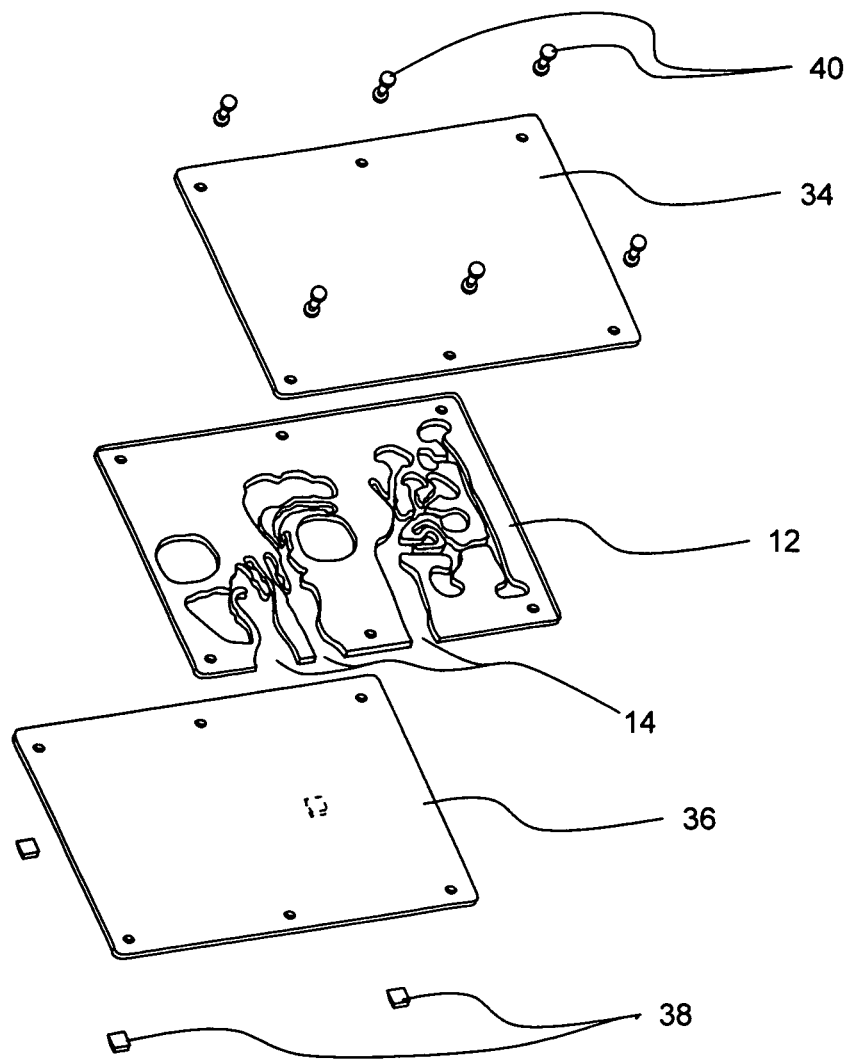
FIG. 3 is an exploded view of the apparatus of FIG. 1.

FIGS. 1-5 show several of many possible embodiments of the apparatus 10, 10a, 10b of the present invention. FIGS. 1-3 show an apparatus 10 which comprises a substantially flat first or middle panel 12, a substantially flat, transparent second or top panel 34 and a substantially flat, optionally opaque bottom panel 36. In an alternative embodiment, one or more of the panels can be combined in one panel. As seen specifically in the view of FIG. 2A, the first or middle panel 12 has a top T surface, a bottom surface B and side surfaces S. A plurality of simulated body openings 14 are formed in a side surface S of the first or middle panel 12. Primary passageways 16 extend inwardly from each simulated body opening 14. Secondary passageways 18 branch off of or are otherwise connected to the primary passageways 16. Tertiary passageways 20 branch off of or are otherwise connected to the secondary passageways 18. Additional passageways 24 may branch off of or may be otherwise connected (serially or in parallel) to the tertiary passageways 24. Simulated body cavities 26 may also be formed in the first or middle panel 12 and such body cavities 26 may be accessed through one or more of the passageways 16, 18, 20, 24.

The transparent second or top panel 34 serves as a window through which an operator may view medical or surgical device(s) as they are inserted through the simulated body openings 14 and advanced through the primary passageway 16. Positioning of medical or surgical devices often are done under fluoroscopic guidance during actual medical procedures. The transparent panel allows the operator to view the devices thus simulating fluoroscopic guidance. The third or bottom panel 36 may be a substantially flat panel attached in substantial juxtaposition to the bottom of the first or middle panel 12. The first (middle), second (top) and third (bottom) panels 12, 34, 36 may be stacked upon one another as shown and attached to one another by screws 40 or any other suitable attachment material or apparatus. Feet 38 may optionally be mounted or formed on the underside of the third or bottom panel 36 to facilitate placement of the apparatus 10 on a flat surface such as a desktop or laboratory bench.

Simulated anatomical structures 17 may be formed adjacent to the area formed in the panel adjacent to one or more of the passageways 16, 18, 20, 24 or cavities 26. In some embodiments, these simulated anatomical structures may be located and configured to represent anatomical processes or protrusions that the operator must avoid or navigate around. Also, in some embodiments, these anatomical structures 17 may represent sensitive or delicate anatomical structures that must not be penetrated or damaged as the operator advances a medical or surgical device through the passageways 16, 18, 20, 24 and/or into the cavities 26.

On the left side of this apparatus 10, the passageways 16, 18, 20, 24, cavities 26 and anatomical structures 17 are designed to simulate the paranasal anatomy so as to be useful for simulation of procedures wherein medical or surgical devices are inserted through the nose and used to perform endonasal or transnasal procedures including but not limited to procedures using Balloon Sinuplasty™ tools as described in incorporated U.S. patent application Ser. No. 10/829,917, Ser. No. 10/944,270, Ser. No. 11/116,118 and Ser. No. 11/150,847 and/or the implantation of drug delivery devices, stents or other implants as described, for example, U.S. patent application Ser. No. 11/544,009, Ser. No. 11/234,395, Ser. No. 10/829,917, Ser. No. 10/912,578 and Ser. No. 10/470,881, which are also expressly incorporated herein by reference. In particular, the simulated body openings 14 include nasal openings NO of the nares. The passageways 16, 18, 20, 24, represent various endonasal passages, and the anatomical structures 17 simulate the nasal turbinates TR, septum SEP and uncinate process UP. The body cavities 26 represent a maxillary sinus MS, frontal sinus FS and orbits.

On the right side of this apparatus 10, a generic network of passageways 16, 18, 20, 24, body cavities 26 and anatomical structures 17 is provided. Thus generic network is not intended to simulate any specific portion of a patient's anatomy, but rather, includes various curves, protrusions, obstructions, narrowed areas and other attributes that are useful for general practice in advancing and positioning interventional devices such as guidewires, catheters, scopes, etc.

In typical use, the operator inserts a medical or surgical device through a simulated body opening 14 and then navigates such device(s) through passageways 16, 18, 20, 24, around anatomical structures 17 and in some cases into body cavities 26. The movement and/or positioning of such device(s) may be viewed continuously or at desired time points through the transparent second (top) panel 34. In the particular example shown in FIG. 1, a guide 30 has been inserted through the simulated body opening 14 that represents a nasal opening NO, advanced through a primary passageway 16 representing the nasal cavity NC and into a secondary passageway 18 representing the frontal recess FR.

The operator may observe such advancement and positioning of this guide 30 through the transparent second (upper) panel 34. Thereafter, a guidewire 32 is advanced through the guide 30 and into the adjacent body cavity 26 representing the frontal sinus FS. The operator may observe such advancement and positioning of the guidewire 32 through the transparent second (upper) panel 34.

As those of ordinary skill in the art will appreciate, once the guidewire 32 has been advanced into the simulated body cavity 26, another working device (not shown) may be advanced over the guidewire 32 and to a desired position, as the operator observes through the transparent second (upper) panel 34. Such working device may, in some cases, comprise a dilation catheter (e.g., a balloon catheter) that is advanced over the guidewire 32 to a position where its dilator (e.g., balloon) is positioned within a passageway representing the ostium of the frontal sinus FS. In some instances the guide 30 may be withdrawn and the working device may be advanced over the guidewire alone. In other instances, both the guide 30 and guidewire 32 may remain in place and the working device may be advanced through the guide 30 and over the guidewire 32. In still other applications, use of the guidewire GW may be unnecessary and a working device may simply be advanced through the guide 30. In addition to dilation catheters (e.g., balloon catheters) the types of working devices that may be inserted, advanced and positioned using this method include but are not limited to; cutting devices, atherectomy devices, implantable devices, implantable substance delivery devices, scopes, energy delivering devices, injection devices, sensors, electrodes, etc.

Because the panels 12, 34, 36 are substantially flat, the various passageways 16, 18, 20, 24, cavities 26 and anatomical structures 17 are substantially flat or two-dimensional while in an actual patient the body passages, structures and cavities represented thereby may exist in a more three dimensional state. By flattening or reducing the third dimension, this device 10 may allow an operator to initially learn to perform a particular procedure in two dimensions before progressing to a more anatomically accurate three-dimensional model or to work in an animal, cadaver or actual human patient.

Figure 4A:
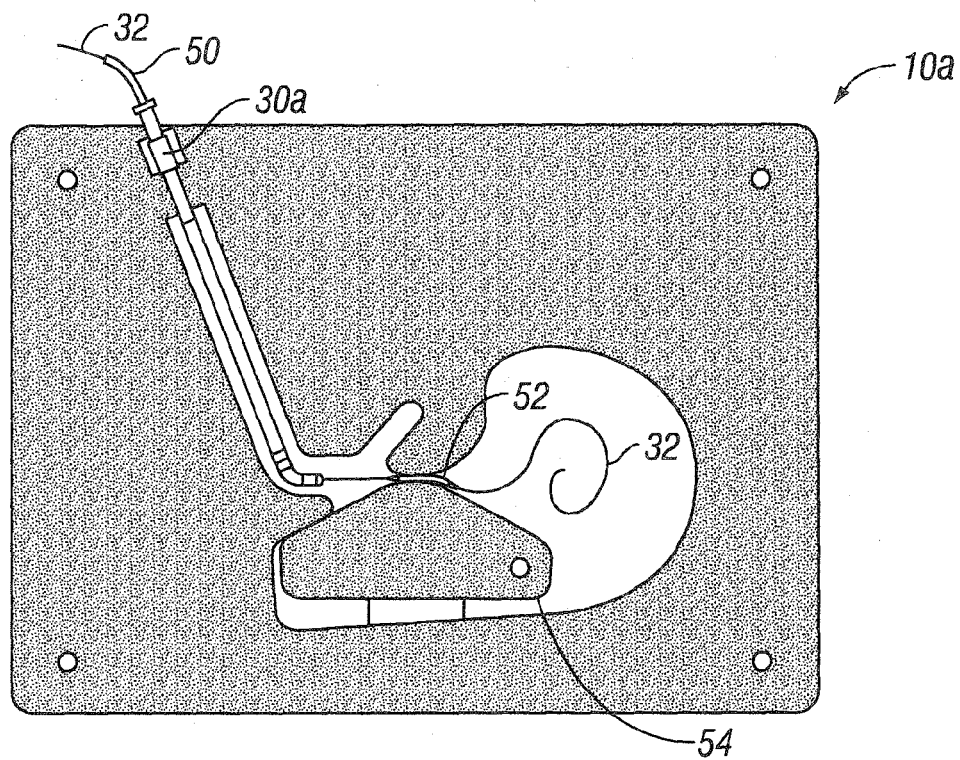
FIG. 4A is a schematic diagram of an embodiment of an apparatus of the present invention incorporating an optional moveable member in a first position and having a guidewire, guide catheter and balloon catheter inserted therein.
Figure 4B:
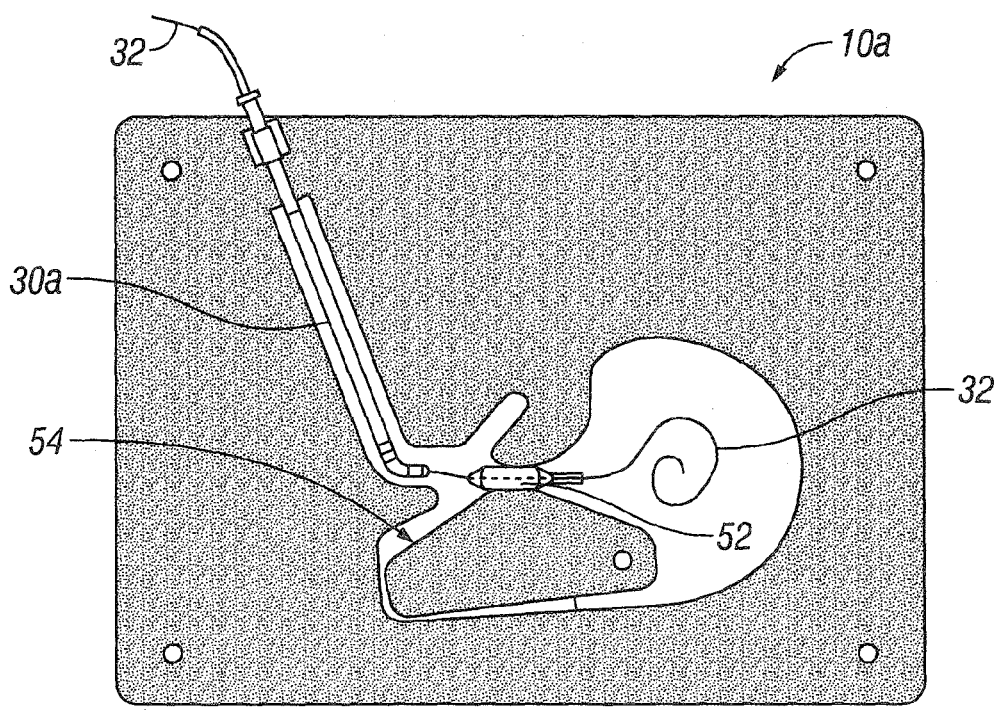
FIG. 4B is a schematic diagram of the embodiment of FIG. 4B with the balloon inflated and the optional moveable member moved to a second position.

FIGS. 4A and 4B show another apparatus 10a of the present invention that may be of the same basic construction as the embodiment shown in FIGS. 1-3, but which includes an optional moveable member 54 which may be used to indicate when a device, such as a balloon catheter 50 has been properly positioned and/or effectively used for an intended purpose. In the showing of FIG. 4A, the optional moveable member 54 is in a first position. A curved guide catheter 30a has been inserted into the apparatus 10a, a guidewire 32 has been advanced through the guide catheter 30a and through the space between the moveable member 54 and an adjacent wall of simulated anatomical structure. This may simulate advancement of the guidewire through a particular anatomical passage, such as a constricted ostium of a paranasal sinus. Also in FIG. 4A, the balloon catheter 50 has been advanced through the guide catheter 30a and over the guidewire 32 to a position where the deflated balloon 52 is positioned between the moveable member 54 and an adjacent wall of simulated anatomical structure, thereby simulating placement of the balloon 52 at the intended position (e.g., within a constricted ostium of a paranasal sinus).

In FIG. 4B, the balloon 52 is inflated, causing the moveable member 54 to move to a second position, as shown. Such movement of the optional moveable member 54 indicates that the balloon 52 has preformed its intended function (e.g., dilation of the constricted ostium of a paranasal sinus). As those of skill in the art will recognize, various other indicator members or indicator materials may be incorporated into the apparatus of the present invention to indicate when a particular device has or has not been correctly positioned or used.

Figure 5:
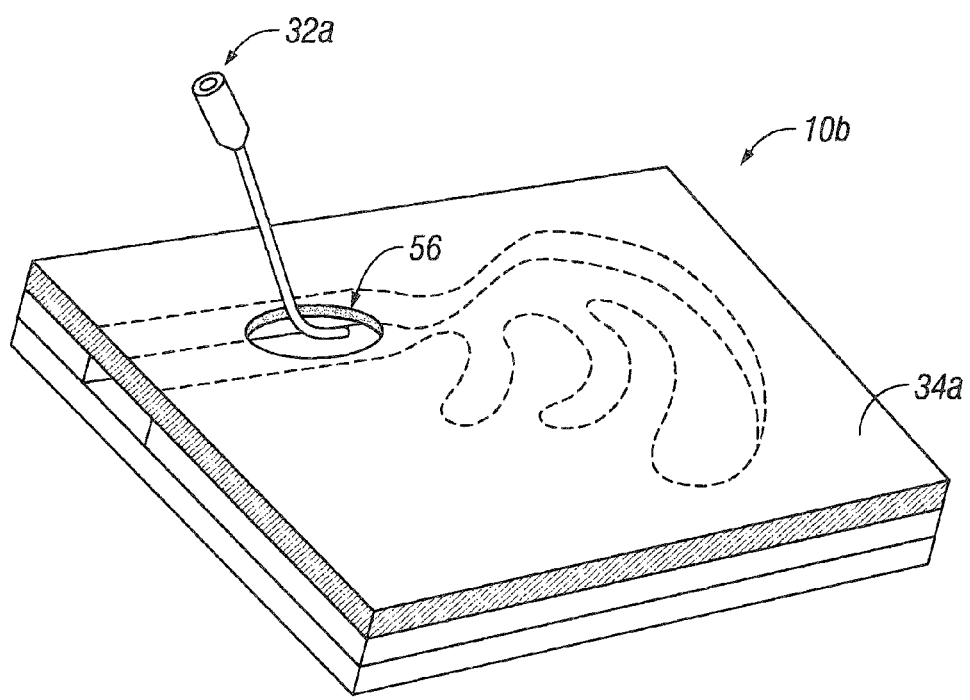
FIG. 5 is a schematic diagram of an embodiment of an apparatus of the present invention incorporating an optional opening in the second or top panel with an instrument inserted through such opening.

FIG. 5 shows another embodiment of the apparatus 10b that may be of the same basic construction as the embodiment shown in FIGS. 1-3, but which includes an optional simulated anatomical opening 56 in the top panel 34a. In the showing of FIG. 5, a curved guide catheter 32a has been inserted through such optional opening 56. Those of skill in the art will appreciate that various opening may be formed at various locations in any of the apparatus 10, 10a, 10b of the present invention to simulate the actual locations of natural or man made body openings. Also, in some embodiments, ports or openings may be formed in the top panel 34, bottom panel 36 or elsewhere to allow substances or materials to be deposited in the simulated anatomical passageways to mimic the present of certain substances (e.g., body fluids, mucous, blood, puss) or pathological or anomalous conditions (e.g., polyps, tumors, fungus, mucoceles, etc.), thereby enhancing the use of the apparatus 10, 10a, 10b for training in the use of devices such as suction apparatus, irrigators, cutters, debriders, diagnostic catheters, etc.

It is to be further appreciated that, to add an increased sense or realism or three dimensional effect, the top panel 34 may be translucent or semi-opaque (with or without transparent areas) to simulate the effects of light emitting devices such as transilluminating lightwires or endoscopes and, thus, such apparatus may be used for training in the use of such light emitting devices.

In some embodiments, the apparatus 10, 10a, 10b of this invention may be endowed with more depth or three dimensional characteristics (e.g., like an actual human head or actual body part) to simulate actual insertion, manipulation and use of a scope and/or other devices. Any portions of the apparatus 10, 10a, 10b may be clear or opaque so that one may visualize via an inserted scope and/or through the sides of the apparatus (or not).

It is to be appreciated that the invention has been described hereabove with reference to certain examples or embodiments of the invention but that various additions, deletions, alterations and modifications may be made to those examples and embodiments without departing from the intended spirit and scope of the invention. For example, any element or attribute of one embodiment or example may be incorporated into or used with another embodiment or example, unless otherwise specified of if to do so would render the embodiment or example unsuitable for its intended use. Also, where the steps of a method or process have been described or listed in a particular order, the order of such steps may be changed unless otherwise specified or unless doing so would render the method or process unworkable for its intended purpose. All reasonable additions, deletions, modifications and alterations are to be considered equivalents of the described examples and embodiments and are to be included within the scope of the following claims.

What is claimed is:

1. An apparatus useable for simulated insertion and positioning of a medical or surgical device within an anatomical opening or passageway that leads to a paranasal sinus, said apparatus comprising:
    a substantially flat first panel having a top surface, a bottom surface and at least one side surface;
    a simulated nasal opening formed in a side surface of the first panel;
    a simulated nasal passage with a simulated intranasal septum on one side thereof;
    at least one simulated paranasal sinus cavity;
    at least one ostium or tract connecting the simulated nasal passage to said at least one simulated paranasal sinus cavity; and
    a substantially flat second panel mounted in juxtaposition to the top surface of the flat first panel, said second panel comprising a window through which an operator may view the medical or surgical device as it is inserted through the simulated nasal opening and advanced through the simulated nasal passage to a position within said at least one ostium or tract or said at least one simulated paranasal sinus cavity; and
    a substantially flat third panel mounted in juxtaposition to the bottom surface of the flat first panel;
    wherein the simulated nasal passage and at least one simulated paranasal sinus cavity are substantially two-dimensional simulations of anatomical structures that naturally occur in three dimensions in the actual human paranasal anatomy.

2. An apparatus according to claim 1 wherein a plurality of simulated nasal openings are formed in one or more side surfaces of the panel.

3. An apparatus according to claim 1 further comprising one or more additional, substantially two-dimensional, simulated anatomical structures selected from projections, organs, bones, nasal turbinates and ucinate processes.

4. A method for simulated insertion and positioning of a medical or surgical device using an apparatus according to claim 1, said method comprising the steps of:
    A) inserting a medical or surgical device through the simulated nasal opening; and
    B) advancing the medical or surgical device through the through the substantially two-dimensional simulated nasal passage to a position within said at least one ostium or tract or said at least one substantially two-dimensional simulated paranasal sinus cavity while observing the advancement of the device through said window.

5. A method according to claim 4 wherein the medical or surgical device comprises a guide.

6. A method according to claim 4 wherein the medical or surgical device comprises a guidewire.

7. A method according to claim 4 wherein the medical or surgical device comprises a guide and a guidewire.

8. A method according to claim 5 further comprising the step of advancing a working device through the guide.

9. A method according to claim 6 further comprising the step of advancing a working device over the guidewire.

10. A method according to claim 7 further comprising the step of advancing a working device over the guidewire and through the guide.

11. A method according to claim 8 wherein the working device is selected from the group consisting of: dilation catheters, balloon catheters, cutting devices, atherectomy devices, implantable devices, implantable substance delivery devices, scopes, energy delivering devices, injection devices, sensors, and electrodes.

12. A method according to claim 4 wherein the operator observes advancement of a guide wire into a simulated paranasal sinus cavity and subsequent advancement of a working device over the guidewire to a position within a simulated ostium or tract that leads into that simulated paranasal sinus cavity.

13. A method according to claim 11 wherein the window comprises a transparent second panel placed in substantial juxtaposition to a top side of the first panel and wherein the operator observes the advancement or positioning of the medical or surgical device through that transparent second panel.

* * * * *